(12) United States Patent
Sakai

(10) Patent No.: US 12,499,592 B2
(45) Date of Patent: Dec. 16, 2025

(54) IMAGE PROCESSING APPARATUS FOR GENERATING COLOR-REDUCED IMAGE, CONTROL METHOD THEREOF, AND STORAGE MEDIUM

(71) Applicant: CANON KABUSHIKI KAISHA, Tokyo (JP)

(72) Inventor: Hiroyuki Sakai, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 195 days.

(21) Appl. No.: 18/397,169

(22) Filed: Dec. 27, 2023

(65) Prior Publication Data
US 2024/0233208 A1     Jul. 11, 2024

(30) Foreign Application Priority Data

Jan. 5, 2023 (JP) ................................. 2023-000569

(51) Int. Cl.
*G06T 11/00* (2006.01)
*G06T 5/50* (2006.01)
(Continued)

(52) U.S. Cl.
CPC .............. *G06T 11/001* (2013.01); *G06T 5/50* (2013.01); *G06T 7/90* (2017.01); *G06V 10/56* (2022.01);
(Continued)

(58) Field of Classification Search
CPC ........ G06T 11/001; G06T 11/20; G06T 11/40; G06T 11/60; G06T 5/50; G06T 7/90;
(Continued)

(56) References Cited

U.S. PATENT DOCUMENTS 6,137,903 A * 10/2000 Dichter .................. H04N 1/622
382/167
2002/0075491 A1* 6/2002 Bares ...................... H04N 1/56
358/1.9
(Continued)

FOREIGN PATENT DOCUMENTS

JP         2003309727 A     10/2003

*Primary Examiner* — Wesner Sajous
(74) *Attorney, Agent, or Firm* — ROSSI, KIMMS & McDOWELL LLP

(57) ABSTRACT

An image processing apparatus capable of generating a color-reduced image having high object reproducibility. The image processing apparatus: determines a first representative color(s)/a second representative color/a third representative color, based on an RGB value of a pixel determined to have a high chroma attribute/a low chroma attribute/a low brightness attribute based on a chroma binary image/on a chroma binary image/on a brightness binary image, among pixels constituting an acquired image; generates a converted image by converting the RGB value of the pixel having the high chroma attribute/low chroma attribute into an RGB value indicating the first representative color/second representative color; generates a color-reduced image by converting the RGB value of the pixel determined to have the low brightness attribute among pixels constituting the converted image into an RGB value indicating the third representative color.

8 Claims, 19 Drawing Sheets

(51) Int. Cl.
*G06T 7/90* (2017.01)
*G06V 10/56* (2022.01)
*G06V 10/60* (2022.01)
*G09G 5/02* (2006.01)
*G09G 5/06* (2006.01)
*G09G 5/10* (2006.01)
*H04N 1/60* (2006.01)
*H04N 5/57* (2006.01)
*H04N 9/64* (2023.01)
*H04N 9/77* (2006.01)

(52) U.S. Cl.
CPC .... *G06V 10/60* (2022.01); *G06T 2207/20221* (2013.01)

(58) Field of Classification Search
CPC ............. G06T 7/11; G06T 2207/20221; G06T 2207/10024; G06T 2207/20021; G06T 5/00–5/008; G06T 5/40; G06T 5/94; G06T 7/40–44; G06V 10/56; G06V 10/60; G06K 15/129; G01B 11/2513; H04N 1/56–60; H04N 1/6019–6027; H04N 1/6075; H04N 5/202; H04N 5/445; H04N 5/57–58; H04N 9/64–79; H04N 1/465; G09G 5/02; G09G 5/06; G09G 5/10; G09G 2320/06–0666; G09G 2320/0271; G09G 2320/0276; G01J 3/50–52; G01J 3/462–463; G06F 17/00; G06F 17/10–12; G06F 1/03
See application file for complete search history.

(56) References Cited

U.S. PATENT DOCUMENTS

| | | | |
|---|---|---|---|
| 2002/0080998 A1* | 6/2002 | Matsukawa | G08G 1/0962 382/162 |
| 2017/0132836 A1* | 5/2017 | Iverson | G06T 17/10 |
| 2018/0012339 A1* | 1/2018 | Puetter | G06T 5/90 |

* cited by examiner

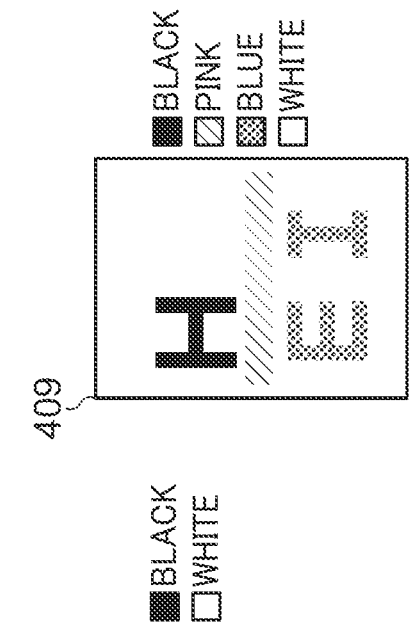
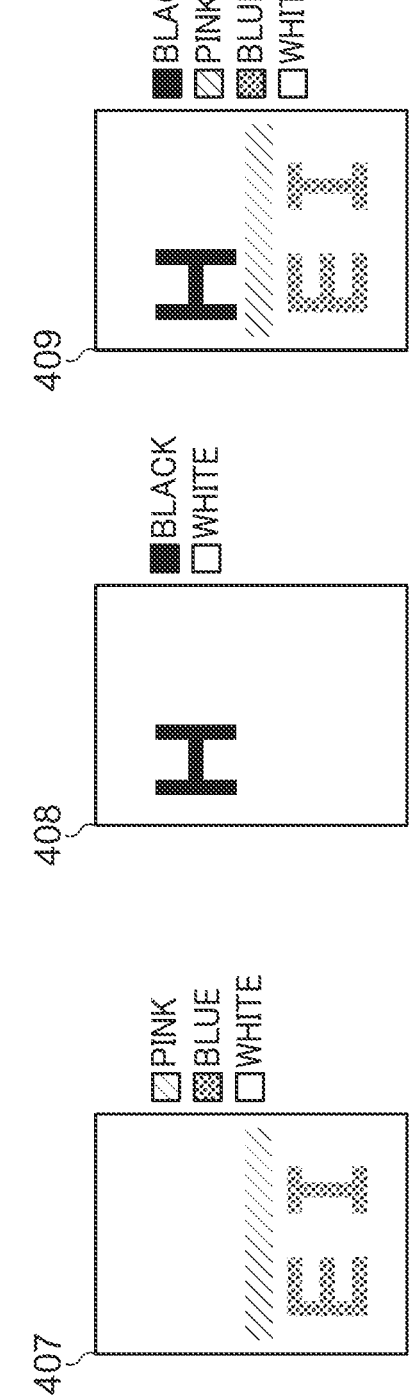

| COLOR | START COORDINATES | END COORDINATES | NUMBER OF PIXELS |
|---|---|---|---|
| WHITE | (X1,Y1) | (X2,Y2) | 1000 |
| BLACK | (X3,Y3) | (X4,Y4) | 150 |
| PINK | (X5,Y5) | (X6,Y6) | 200 |
| BLUE | (X7,Y7) | (X8,Y8) | 300 |

| COLOR | START COORDINATES | END COORDINATES | NUMBER OF PIXELS |
|---|---|---|---|
| WHITE | (X1,Y1) | (X2,Y2) | 1000 |
| BLUE | (X7,Y7) | (X8,Y8) | 300 |
| PINK | (X5,Y5) | (X6,Y6) | 200 |
| BLACK | (X3,Y3) | (X4,Y4) | 150 |

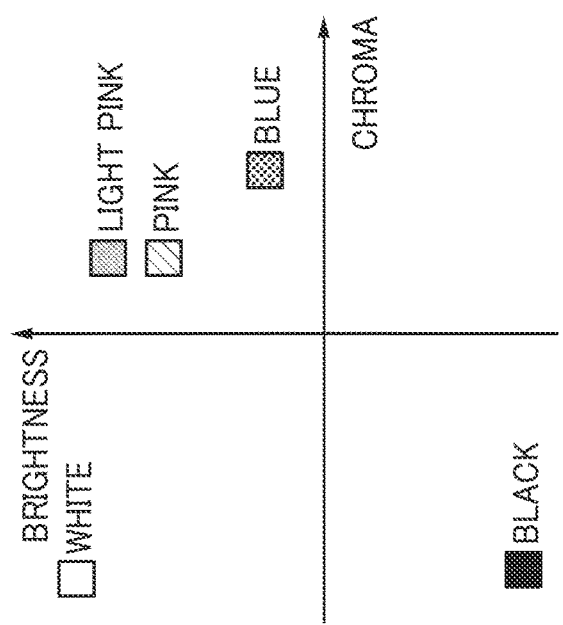
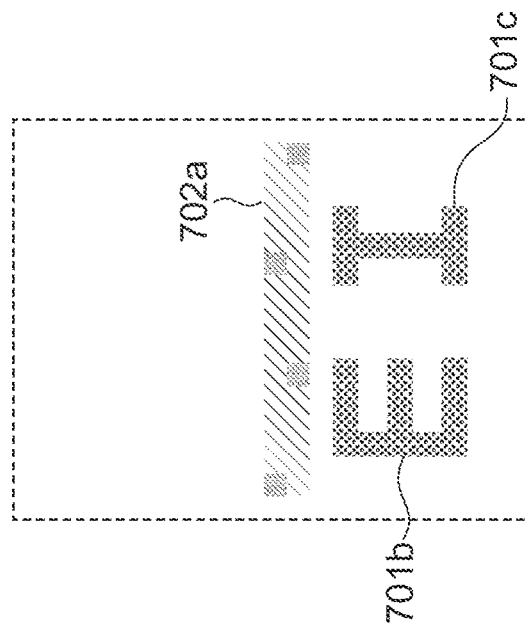

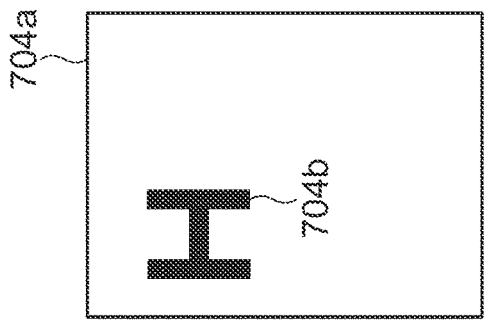

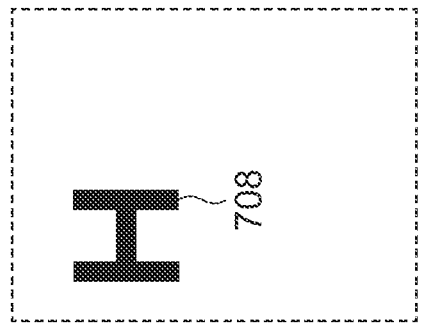
FIG. 7I
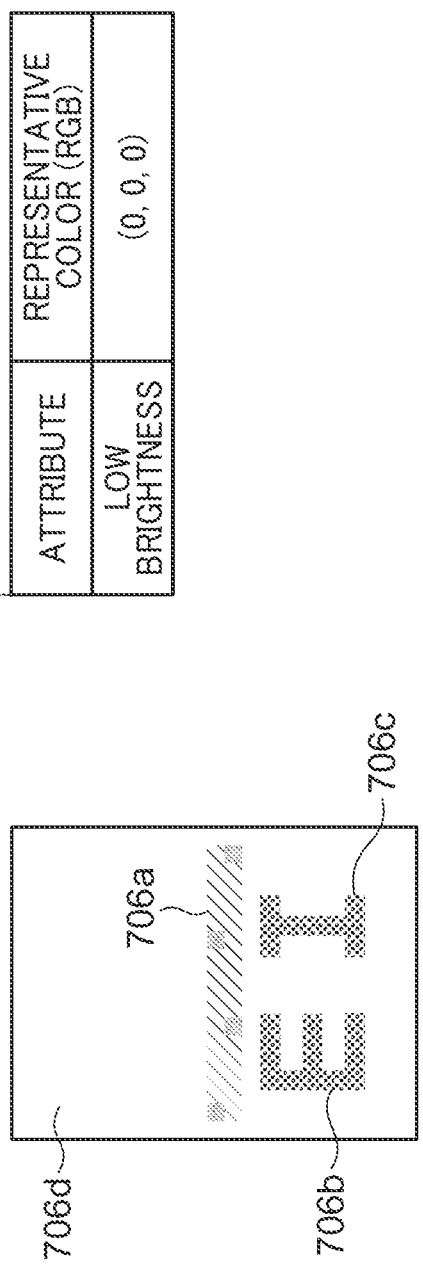
FIG. 7H
FIG. 7G

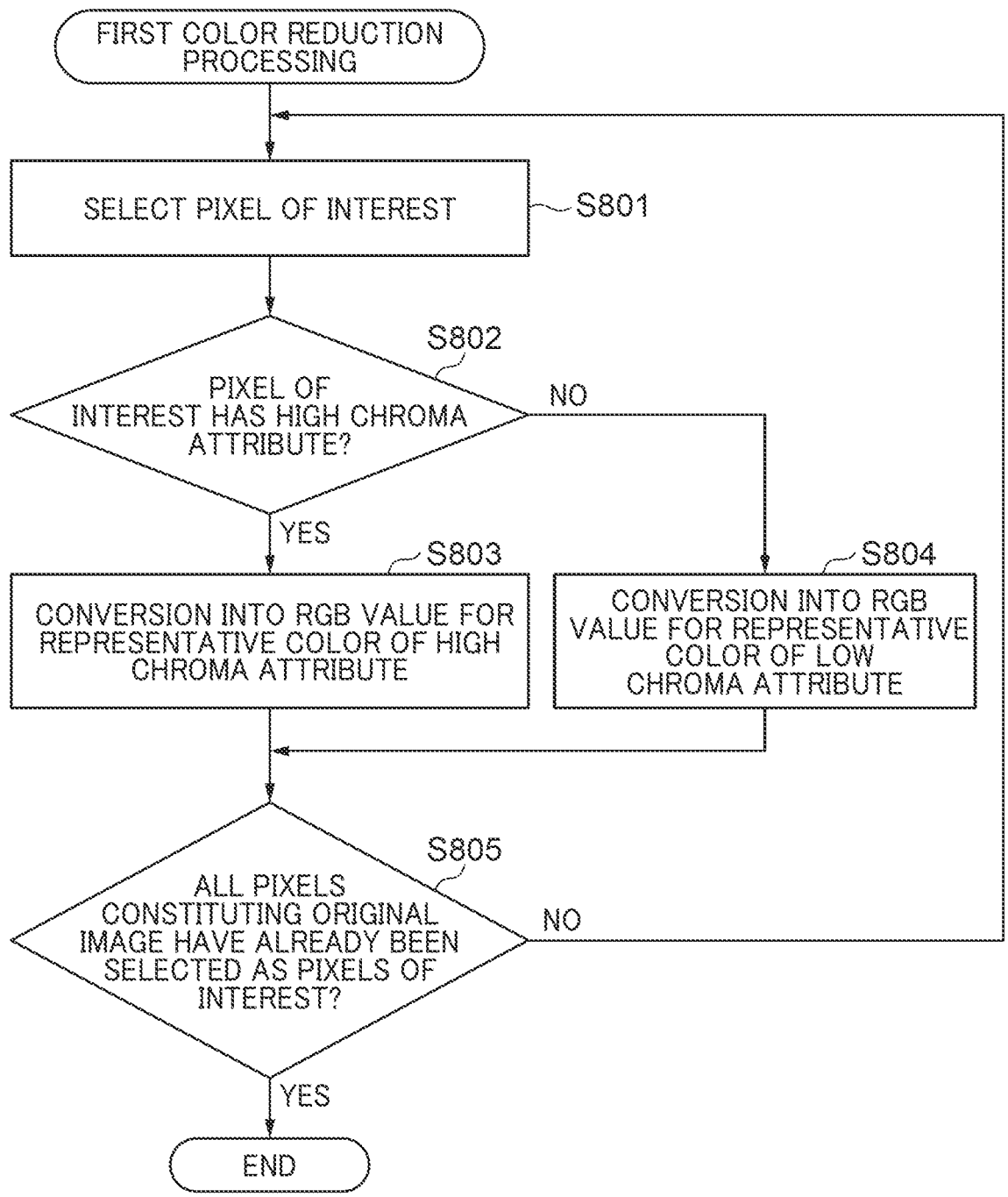

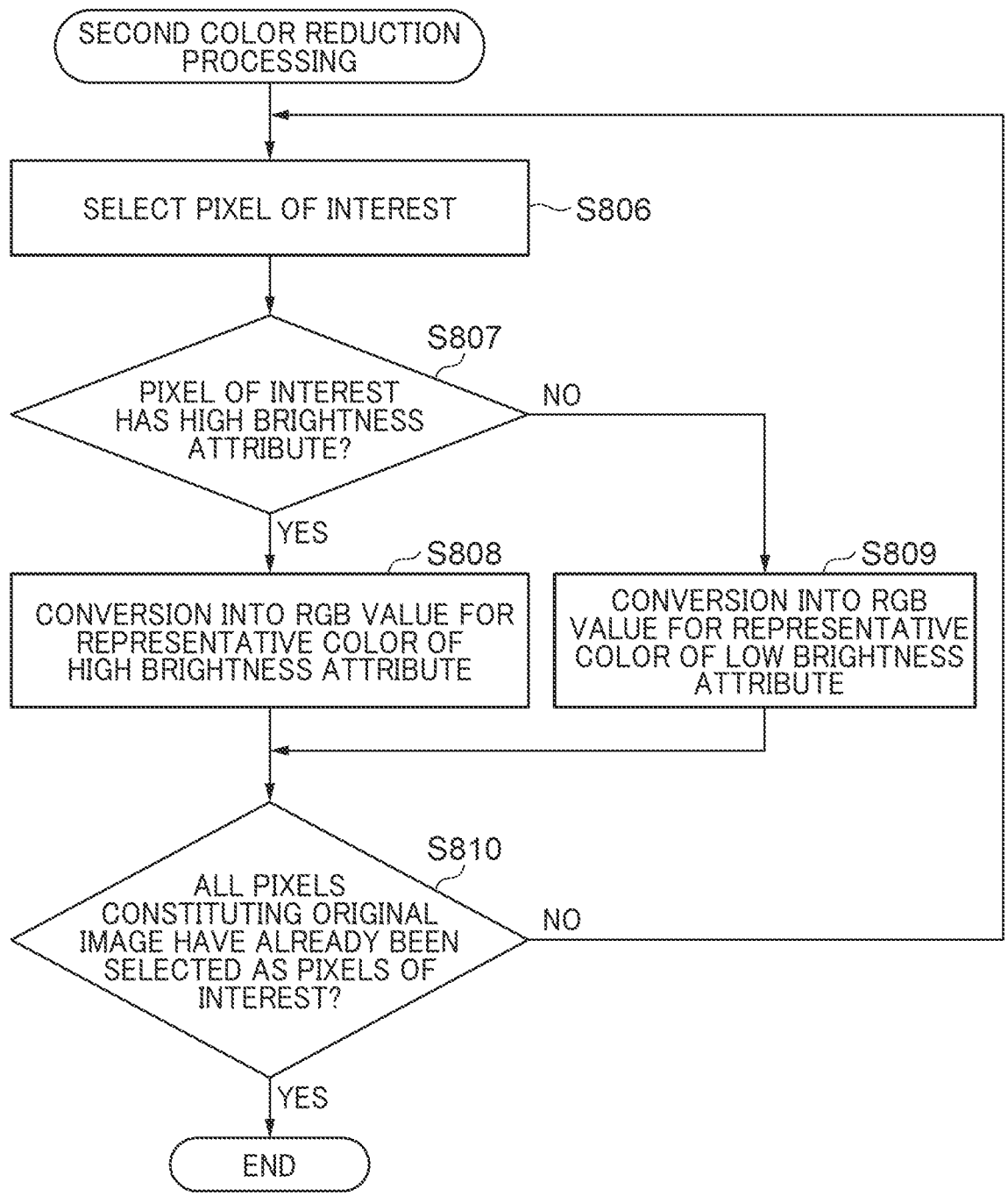

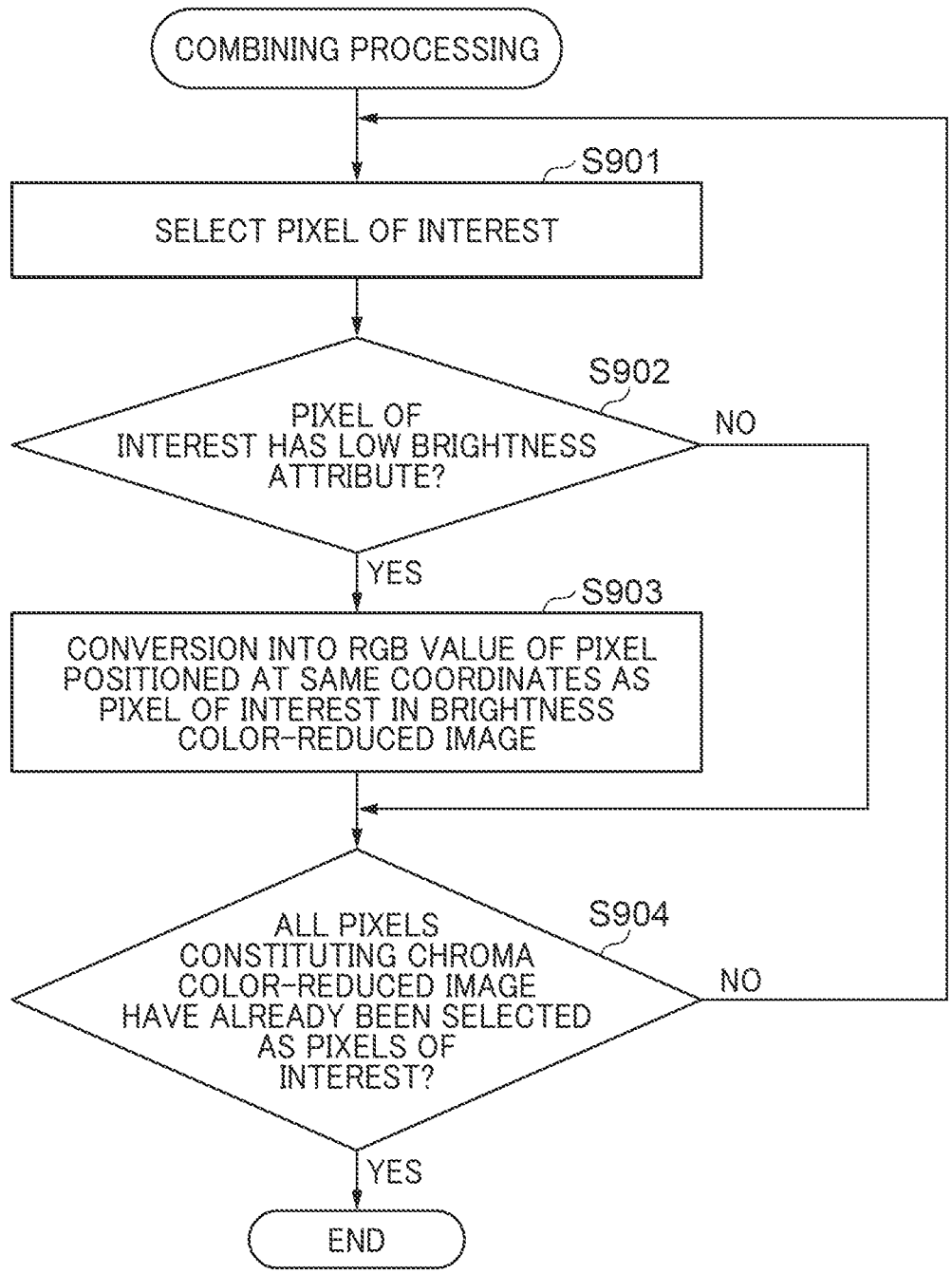

1001

1002

1003

1001

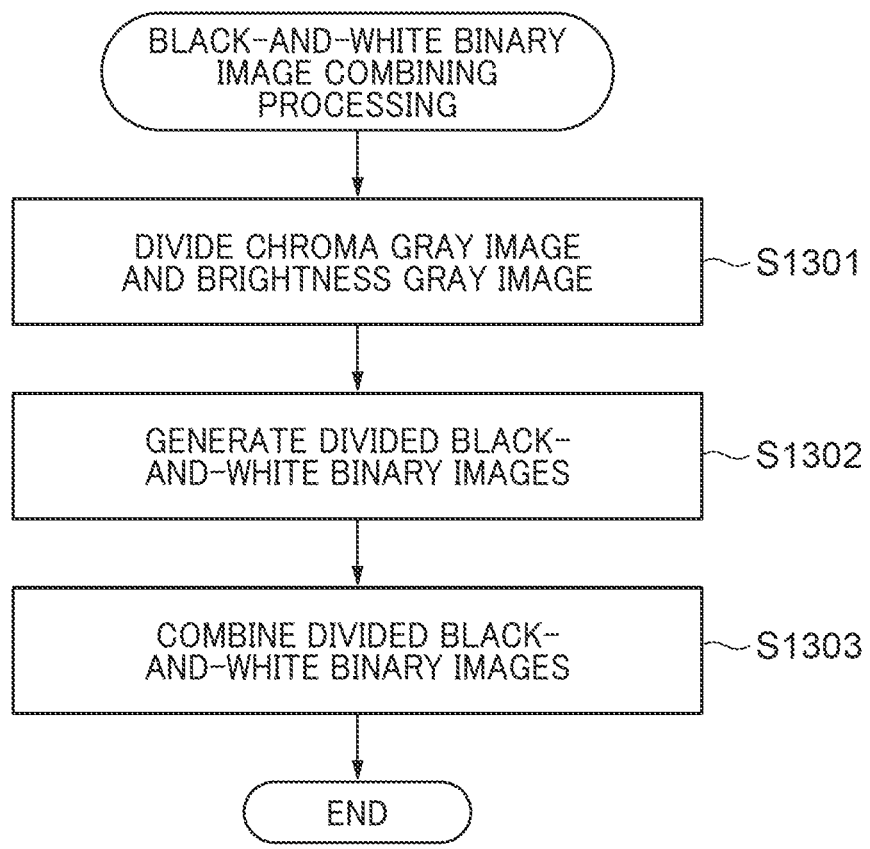

IMAGE PROCESSING APPARATUS FOR GENERATING COLOR-REDUCED IMAGE, CONTROL METHOD THEREOF, AND STORAGE MEDIUM

BACKGROUND OF THE INVENTION

Field of the Invention

The present invention relates to an image processing apparatus for generating a color-reduced image, a control method thereof, and a storage medium.

Description of the Related Art

In recent years, with the spread of color printers and color scanners, the number of colored documents has increased, and opportunities to scan and import such documents, save them as electronic files, and send them via the Internet or the like are increasing. However, full color data has a large data size, which takes up a lot of storage space in a storage device, and places a heavy load on communication lines. For this reason, it is necessary to reduce the data size of the colored document in some way.

Examples of a method of compressing a color image include a method of converting a color image into a binary image having a pseudo gradation using error diffusion or the like and compressing the binary image, a method of compressing a color image in a JPEG format, and a method of converting a color image into a palette color of 8 bits or the like and performing ZIP compression or LZW compression.

In Japanese Laid-Open Patent Publication (kokai) No. 2003-309727, color reduction processing is performed on an original image, color information and an index color image are output, a binary image and background color information for each color are generated, and compression processing is performed by a method such as MMR. The method according to Japanese Laid-Open Patent Publication (kokai) No. 2003-309727 achieves compression with higher compression efficiency and reproducibility than the various compression methods described above.

In an image obtained by scanning a paper document, a luminance value varies in a region of a handwritten object having a high luminance value, such as a line drawn with a fluorescent pen. When the above-described color reduction processing disclosed in Japanese Laid-Open Patent Publication (kokai) No. 2003-309727 is executed on such an image, for example, some pixels in the region of the object having variations in luminance value may be color-reduced to white, which is a background color. As a result, a color-reduced image in which a character is blurred, that is, a color-reduced image having low object reproducibility is generated.

SUMMARY OF THE INVENTION

The present invention provides an image processing apparatus capable of generating a color-reduced image having high object reproducibility, a control method thereof, and a storage medium.

Accordingly, the present invention provides an image processing apparatus comprising at least one memory that stores a set of instructions, and at least one processor that executes the instructions, the instructions, when being executed, causing the image processing apparatus to: generate a chroma binary image for determining whether each pixel constituting an acquired image has a high chroma attribute or a low chroma attribute; generate a brightness binary image for determining whether each pixel constituting the acquired image has a high brightness attribute or a low brightness attribute; determine at least one first type representative color, based on an RGB value of a pixel determined to have the high chroma attribute based on the chroma binary image among pixels constituting the acquired image; determine a second type representative color, based on an RGB value of a pixel determined to have the low chroma attribute based on the chroma binary image among the pixels constituting the acquired image; determine a third type representative color, based on an RGB value of a pixel determined to have the low brightness attribute based on the brightness binary image among the pixels constituting the acquired image; generate a converted image by converting the RGB value of the pixel determined to have the high chroma attribute based on the chroma binary image among the pixels constituting the acquired image into an RGB value indicating the first type representative color, and converting the RGB value of the pixel determined to have the low chroma attribute based on the chroma binary image among the pixels constituting the acquired image into an RGB value indicating the second type representative color; and generate a color-reduced image by converting the RGB value of the pixel determined to have the low brightness attribute based on the brightness binary image among pixels constituting the converted image into an RGB value indicating the third type representative color.

According to the present invention, a color-reduced image having high object reproducibility can be generated.

Further features of the present invention will become apparent from the following description of exemplary embodiments with reference to the attached drawings.

BRIEF DESCRIPTION OF THE DRAWINGS

FIGS. 4A to 4J are diagrams showing examples of data generated in the data processing part of FIG. 2.

FIGS. 7A to 7I are diagrams for explaining conversion of an RGB value of a pixel of interest in the present embodiment.

FIGS. 8A and 8B are a flowchart showing a procedure of first color reduction processing in FIG. 6 and a flowchart showing a procedure of second color reduction processing in FIG. 6, respectively.

FIG. 9 is a flowchart showing a procedure of combining processing in FIG. 6.

FIG. 13 is a flowchart showing another procedure of black-and-white binary image generation processing in step S603 of FIG. 6.

DESCRIPTION OF THE EMBODIMENTS

The present invention will now be described in detail below with reference to the accompanying drawings showing embodiments thereof.

Figure 1:
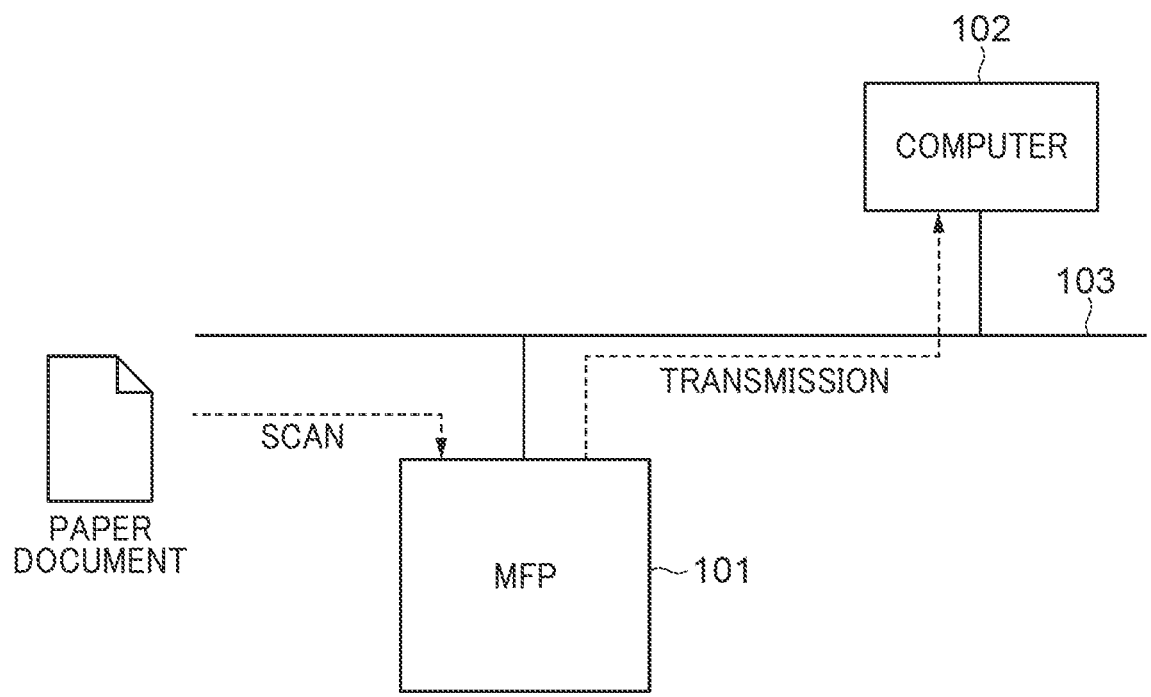
FIG. 1 is a configuration diagram schematically showing a configuration of a system including an MFP as an image processing apparatus according to the present embodiment.

FIG. 1 is a configuration diagram schematically showing a configuration of a system including an MFP 101 as an image processing apparatus according to the present embodiment. This system includes an MFP 101 and a computer (hereinafter referred to as "PC") 102. The MFP 101 is connected to the PC 102 via a network 103.

The user can perform scan settings and set a destination (e.g., the PC 102) to which a scanned image obtained by scan processing is transmitted, using an operation part 203 (FIG. 2) included in the MFP 101. As the scan settings, for example, the user can designate a resolution, a compression rate, a data format (e.g., JPEG, TIFF, PDF, or minority color compression), and the like. In the present embodiment, a case where minority color compression is designated as the data format will be described. It should be noted that the minority color compression will be described in detail later. The MFP 101 reads a document and generates a scanned image based on the scan settings designated by the user, compresses the scanned image into a designated data format, and transmits the compressed data to a designated transmission destination such as the PC 102. The PC 102 displays a scanned image corresponding to the received data using a general-purpose viewer.

Figure 2:
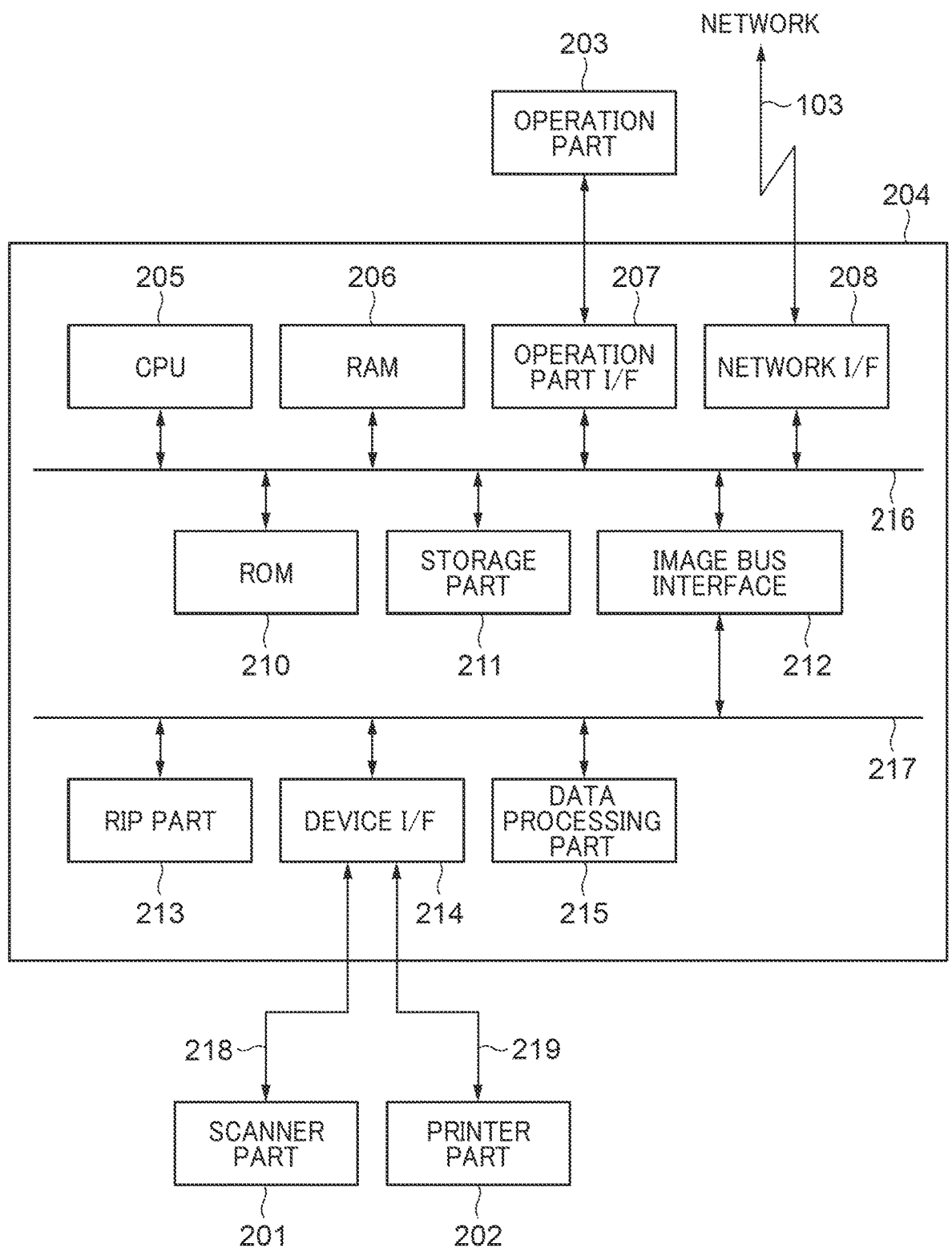
FIG. 2 is a block diagram schematically showing a configuration of the MFP of FIG. 1.

FIG. 2 is a block diagram schematically showing a configuration of the MFP 101 of FIG. 1. The MFP 101 includes a scanner part 201 that is an image input device, a printer part 202 that is an image output device, a control unit 204, an operation part 203 that is a user interface, etc. The control unit 204 is connected to the scanner part 201, the printer part 202, and the operation part 203. In addition, the control unit 204 includes a CPU 205, a RAM 206, an operation part interface (I/F) 207, a network I/F 208, a ROM 210, a storage part 211, a RIP part 213, a device I/F 214, and a data processing part 215. It should be noted that RIP is an abbreviation for Ruster Image Processor.

The control unit 204 functions as a controller connected to the network 103 via the network I/F 208 to input and output image information and device information.

The CPU 205 is a processor that controls the entire system. The RAM 206 is a system work memory for the CPU 205 to operate, and is also an image memory that temporarily stores image data. The ROM 210 is a boot ROM, and stores a system boot program and the like. The storage part 211 is a hard disk drive, and stores system control software, image data, and the like.

The operation part I/F 207 is an interface part for connecting the operation part 203 to the control unit 204. The operation part I/F 207 outputs, to the operation part 203, image data to be displayed on the operation part 203. In addition, the operation part I/F 207 acquires, from the operation part 203, information input to the operation part 203 by the user, and transfers the acquired information to the CPU 205. The network I/F 208 connects the MFP 101 to the network 103 to inputs and outputs information in a packet format. In the control unit 204, the CPU 205, the RAM 206, the operation part I/F 207, the network I/F 208, the ROM 210, and the storage part 211 are disposed on a system bus 216.

An image bus interface 212 is a bus bridge that connects the system bus 216 and an image bus 217 that transfers image data at a high speed, and converts a data structure. The image bus 217 includes, for example, a PCI bus or IEEE1394. The RIP part 213, the device I/F 214, and the data processing part 215 are arranged on the image bus 217.

The RIP part 213 executes so-called rendering processing by analyzing a page description language (PDL) code and developing the PDL code into a bitmap image with a designated resolution. The device I/F 214 is connected to the scanner part 201, which is an image input device, via a signal line 218. Further, the device I/F 214 is connected to the printer part 202, which is an image output device, via a signal line 219.

The data processing part 215 is realized by, for example, an ASIC. The data processing part 215 performs image processing on the scanned image generated by the scanner part 201 and image data to be output to the printer part 202. Furthermore, the data processing part 215 performs processing such as minority color compression and OCR. As a result, compressed data 1101 (FIG. 11) is generated. The generated compressed data 1101 is transmitted to a designated transmission destination, e.g., the PC 102, via the network I/F 208 and the network 103. The data processing part 215 can also perform decompression processing on compressed data received via the network I/F 208 and the network 103. The image data obtained through the decompression processing is transferred to the printer part 202 via the device I/F 214. The printer part 202 performs printing processing of the acquired image data.

Figure 3:
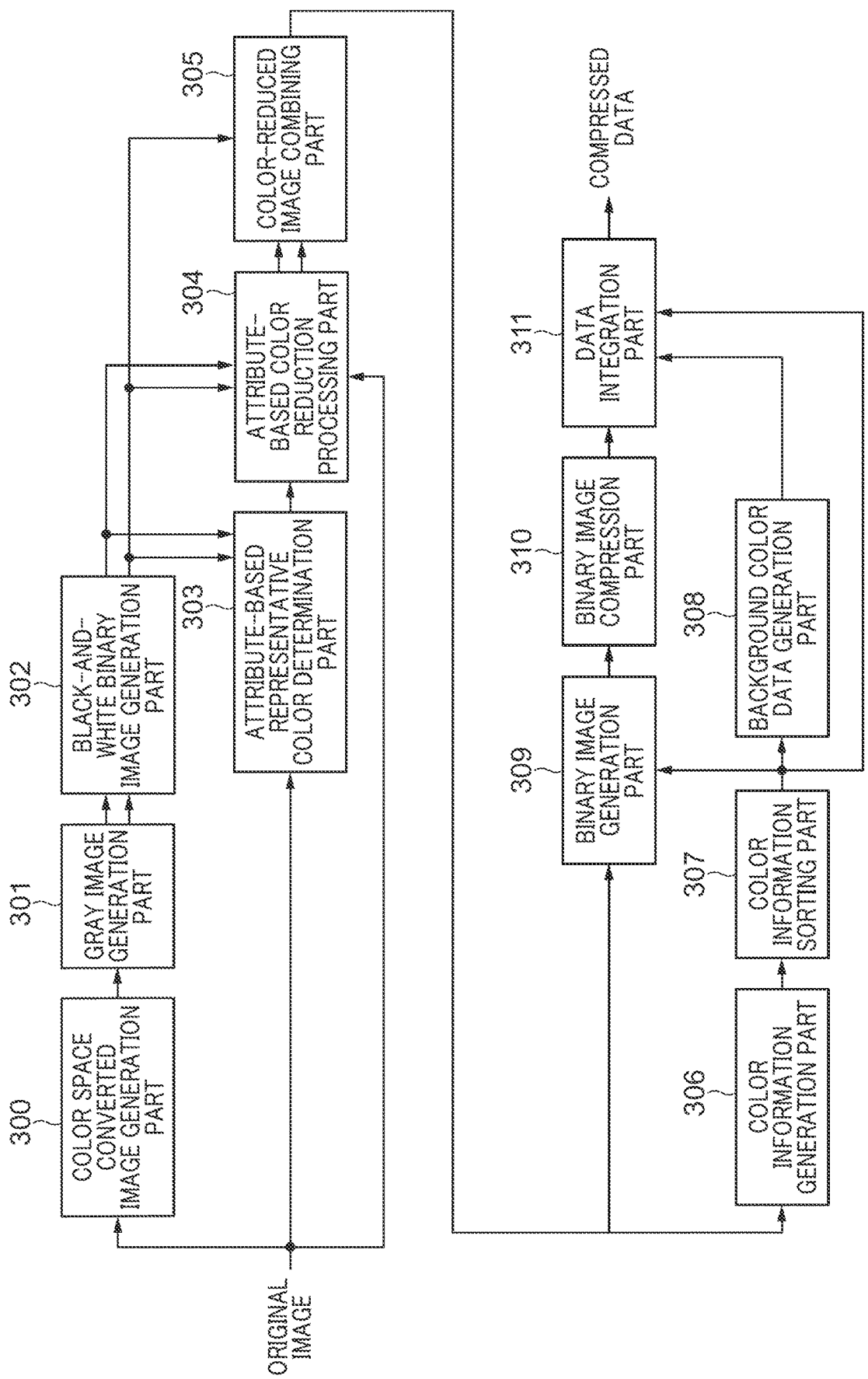
FIG. 3 is a block diagram schematically showing a configuration of a data processing part of FIG. 2.

FIG. 3 is a block diagram schematically showing a configuration of the data processing part 215 of FIG. 2. The data processing part 215 includes a color space converted image generation part 300, a gray image generation part 301, a black-and-white binary image generation part 302, an attribute-based representative color determination part 303, an attribute-based color reduction processing part 304, a color-reduced image combining part 305, a color information generation part 306, a color information sorting part 307, a background color data generation part 308, a binary image generation part 309, a binary image compression part 310, and a data integration part 311. The processing of the module shown in FIG. 3 is executed according to an instruction received by the data processing part 215 from the CPU 205.

Figure 4C:
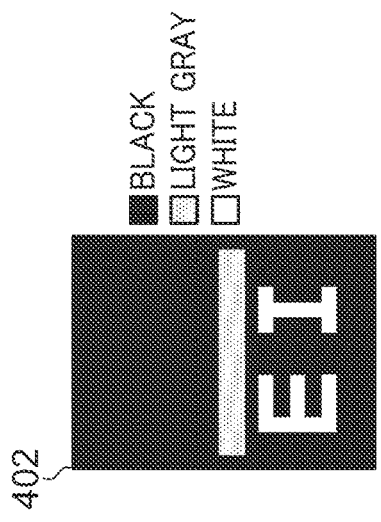
Figure 4B:
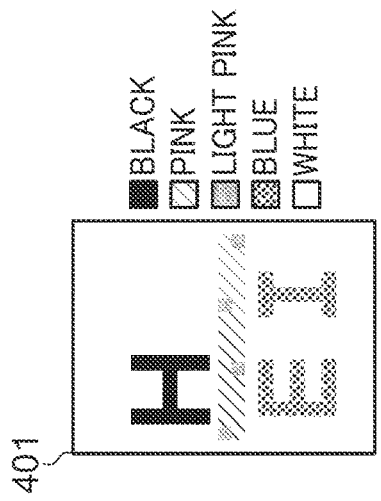
Figure 4A:
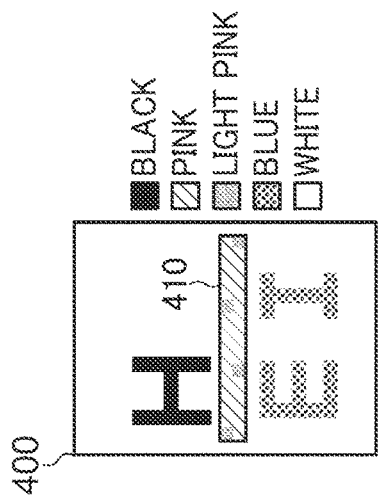

The color space converted image generation part 300 performs color space converted image generation processing based on signal values in an original image 400 of FIG. 4A. The original image 400 is a scanned image generated by the scanner part 201 reading a document on which characters, figures, and the like are drawn in a plurality of colors. The original image 400 includes a plurality of colors, e.g., black, pink, light pink, blue, and white. In the color space converted image generation processing, RGB values of the original image 400 are converted into HSV values. HSV is a color space represented by hue, chroma (saturation), and brightness (value). In the color space converted image generation processing, for example, a known conversion formula is used, and an image of 8 bits for each of RGB is converted into an image of 8 bits for each of HSV. A color space converted image 401 of FIG. 4B is generated by the color space converted image generation processing. It should be noted that the color space converted image generation processing is to convert a color space, not changing the color tone or sharpness of the image. It should be noted that the above-described method is an example, and the color space converted image 401 may be generated by another method.

Figure 4F:
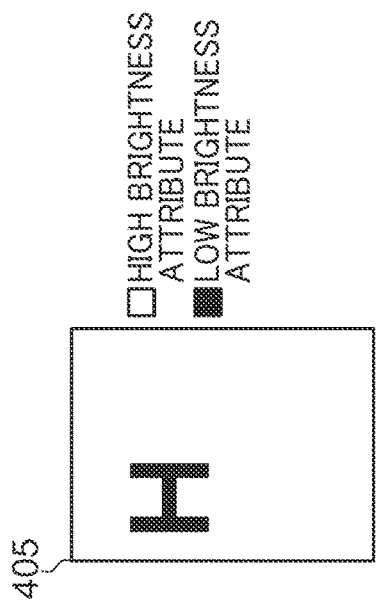
Figure 4E:
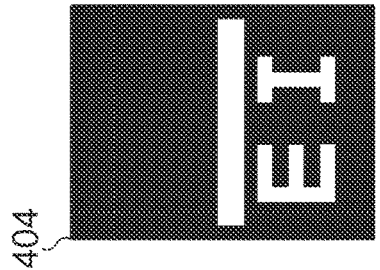
Figure 4D:
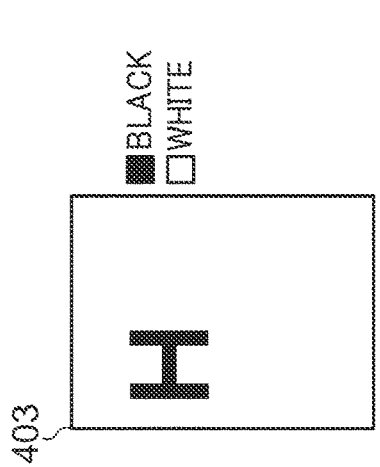

The gray image generation part 301 performs gray image generation processing based on signal values in the color space converted image 401 generated by the color space converted image generation part 300. In the gray image generation processing, a chroma gray image 402 of FIG. 4C is generated by extracting only chroma components from the color space converted image 401. In the gray image generation processing, a brightness gray image 403 of FIG. 4D is generated by extracting only brightness components from the color space converted image 401. Each of the chroma gray image 402 and the brightness gray image 403 is a grayscale 8-bit image having the same size as the original image 400, and includes colors such as black, light gray, and white.

The black-and-white binary image generation part 302 performs black-and-white binary image generation processing based on the gray image generated by the gray image generation part 301. Specifically, the black-and-white binary image generation part 302 generates a chroma black-and-white binary image 404 (chroma binary image) of FIG. 4E based on signal values in the chroma gray image 402 generated by the gray image generation part 301. Furthermore, the black-and-white binary image generation part 302 generates a brightness black-and-white binary image 405 (brightness binary image) of FIG. 4F based on signal values in the brightness gray image 403 generated by the gray image generation part 301.

In the black-and-white binary image generation processing, a binarization method using a signal value distribution in the gray image is used, rather than a binarization method using a fixed value. By performing color reduction processing to be described later using the black-and-white binary images generated by such a binarization method, the reproducibility of the shape of the object can be improved. It should be noted that, although an error diffusion method can be used as the binarization method, the error diffusion method is not suitable for the present embodiment in consideration of the compression efficiency of the binary image compression part 310 to be described later. Therefore, in the present embodiment, "Otsu's binarization" is used as the binarization method.

Each of the chroma black-and-white binary image 404 and the brightness black-and-white binary image 405 is, for example, a 1-bit image having the same size as the original image 400. A pixel value of each pixel constituting the chroma black-and-white binary image 404 is "0" indicating black or "1" indicating white based on the signal values in the chroma gray image 402. A pixel value of each pixel constituting the brightness black-and-white binary image 405 is "0" indicating black or "1" indicating white based on the signal values in the brightness gray image 403.

In the present embodiment, the chroma black-and-white binary image 404 is used to determine whether each pixel constituting original image 400 has a high chroma attribute or a low chroma attribute. For example, among the plurality of pixels constituting the original image 400, a pixel having the same coordinates as a pixel whose pixel value is "1" in the chroma black-and-white binary image 404 is determined to have a high chroma attribute. In addition, among the plurality of pixels constituting the original image 400, a pixel having the same coordinates as a pixel whose pixel value is "0" in the chroma black-and-white binary image 404 is determined to have a low chroma attribute.

Furthermore, in the present embodiment, the brightness black-and-white binary image 405 is used to determine whether each pixel constituting the original image 400 has a high brightness attribute or a low brightness attribute. For example, among the plurality of pixels constituting the original image 400, a pixel having the same coordinates as a pixel whose pixel value is "1" in the brightness black-and-white binary image 405 is determined to have a high brightness attribute. In addition, among the plurality of pixels constituting the original image 400, a pixel having the same coordinates as a pixel whose pixel value is "0" in the brightness black-and-white binary image 405 is determined to have a low brightness attribute.

The attribute-based representative color determination part 303 generates attribute-based representative color information 406 of FIG. 4G to be used for color reduction processing by the attribute-based color reduction processing part 304. In the color reduction processing, a color-reduced image, obtained by reducing the number of colors used in the original image to a predetermined number, is generated. It should be noted that, in the present embodiment, the predetermined number is four as an example. However, the predetermined number is not limited to four, and may be any number as long as it is be three or more and smaller than the number of colors used in the original image. The information indicating the predetermined number is stored in advance in, for example, the ROM 210. The attribute-based representative color information 406 includes an RGB value of a color after the color reduction (hereinafter referred to as a "representative color").

In the generation of the attribute-based representative color information 406, the attribute-based representative color determination part 303 determines a representative color of the high chroma attribute and a representative color of the low chroma attribute based on the chroma black-and-white binary image 404, and determines a representative color of the high brightness attribute and a representative color of the low brightness attribute based on the brightness black-and-white binary image 405. First, the attribute-based representative color determination part 303 creates a histogram of RGB values for each of the high chroma attribute, the low chroma attribute, the high brightness attribute, and the low brightness attribute.

Specifically, the attribute-based representative color determination part 303 creates, as a histogram of RGB values for the high chroma attribute, a histogram of RGB values of pixels having the same coordinates as pixels whose pixel values are "1" in the chroma black-and-white binary image 404, among the plurality of pixels constituting the original image 400. In addition, the attribute-based representative color determination part 303 creates, as a histogram of RGB values for the low chroma attribute, a histogram of RGB values of pixels having the same coordinates as pixels whose pixel values are "0" in the chroma black-and-white binary image 404, among the plurality of pixels constituting the original image 400. In addition, the attribute-based representative color determination part 303 creates, as a histogram of RGB values for the high brightness attribute, a histogram of RGB values of pixels having the same coordinates as pixels whose pixel values are "1" in the brightness black-and-white binary image 405, among the plurality of pixels constituting the original image 400. In addition, the attribute-based representative color determination part 303 creates, as a histogram of RGB values for the low brightness attribute, a histogram of RGB values of pixels having the same coordinates as pixels whose pixel values are "0" in the brightness black-and-white binary image 405, among the plurality of pixels constituting the original image 400.

Then, the attribute-based representative color determination part 303 determines representative colors by selecting a predetermined number of colors that have high appearance frequencies in the created histogram. In the present embodiment, as an example, two colors are determined as the representative colors of the high chroma attribute (first type representative colors). In addition, as an example, one color is determined as the representative color of the low chroma attribute (second type representative color), one color is determined as the representative color of the high brightness attribute, and one color is determined as the representative color of the low brightness attribute (third type representative color). It should be noted that the representative colors of the high chroma attribute are a color having the highest appearance frequency and a color having the second highest appearance frequency in the histogram of RGB values for the high chroma attribute. The representative color of the low chroma attribute is a color having the highest appearance frequency in the histogram of RGB values for the low chroma attribute. The representative color of the high brightness attribute is a color having the highest appearance frequency in the histogram of RGB values for the high brightness attribute. The representative color of the low brightness attribute is a color having the highest appearance frequency in the histogram of RGB values of the low brightness attribute. It should be noted that the method for determining each representative color is not limited thereto.

The attribute-based color reduction processing part 304 executes first color reduction processing (FIG. 8A) using the original image 400, the chroma black-and-white binary image 404, and the attribute-based representative color information 406. By executing the first color reduction processing, a chroma color-reduced image 407 (converted image) of FIG. 4H obtained through color reduction from the original image 400 is generated. The attribute-based color reduction processing part 304 performs second color reduction processing (FIG. 8B) using the original image 400, the brightness black-and-white binary image 405, and the attribute-based representative color information 406. By executing the second color reduction processing, a brightness color-reduced image 408 of FIG. 4I obtained through color reduction from the original image 400 is generated. The color reduction processing will be described in detail later.

The color-reduced image combining part 305 generates a composite color-reduced image 409 (color-reduced image) of FIG. 4J based on the brightness black-and-white binary image 405, the chroma color-reduced image 407, and the brightness color-reduced image 408. The generation of the composite color-reduced image 409 will be described in detail later.

Figures 5A, 5B, 5C:
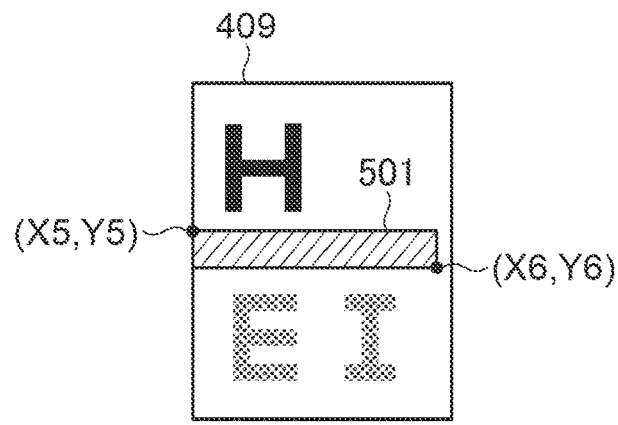
FIGS. 5A to 5C are diagrams for explaining operations of a color information generation part and a color information sorting part of FIG. 3.

The color information generation part 306 generates color management information 500 of FIG. 5A. The color management information 500 includes a plurality of pieces of color information corresponding to each color included in the composite color-reduced image 409. The color information includes coordinate information indicating which range of the composite color-reduced image 409 pixels having a pixel value indicating the corresponding color exist in. The color information further includes information indicating the number of pixels having a pixel value indicating the corresponding color. Among the plurality of pieces of color information included in the color management information 500, the color information about "pink" will be described, as an example. The color information about "pink" includes coordinate information indicating coordinates including all pixels having a pixel value indicating "pink" in the composite color-reduced image 409. The coordinate information is information about coordinates in which, in a region 501 of FIG. 5B, coordinates (X5,Y5) of a pixel at an upper left corner are set as start coordinates and coordinates (X6,Y6) of a pixel at a lower right corner are set as end coordinates. Furthermore, the color information about "pink" includes "200" indicating the total number of pixels having a pixel value indicating "pink" in the composite color-reduced image 409.

The color information sorting part 307 sorts the plurality of pieces of color information included in the color management information 500 based on the number of pixels. As a result, sorted color management information 502 of FIG. 5C is generated. In the sorted color management information 502, color information corresponding to a color having the largest number of pixels is arranged at the top. In FIG. 5C, color information about "white" is at the top of the sorted color management information 502.

The background color data generation part 308 generates background color data based on the color information corresponding to the color arranged at the highest order in the sorted color management information 502. It should be noted that, in the present embodiment, the background color data is assumed to have an 8-bit value for each of RGB, but is not limited thereto.

The binary image generation part 309 generates a binary image based on the composite color-reduced image 409 and the sorted color management information 502. In the present embodiment, a binary image is generated for each of the three colors (e.g., blue, pink, and black) excluding the color arranged at the highest order (e.g., white) in the sorted color management information 502. As an example, the generation of the binary image for pink will be described.

The binary image generation part 309 sets a size that is the same as the size of the region 501 indicated by the coordinate information in the color information about "pink", as an image size of the binary image for pink. In addition, the binary image generation part 309 associates the coordinates (X5,Y5) of the pixel at the upper left corner of the region 501 in the composite color-reduced image 409 with an upper left vertex of the binary image for pink, and associates the coordinates (X6,Y6) of the pixel at the lower right corner of the region 501 in the composite color-reduced image 409 with a lower right vertex of the binary image for pink. The binary image generation part 309 generates a binary image by setting a pixel value of pixels positioned at the same coordinates as "the pixels having a pixel value indicating pink in the composite color-reduced image 409" to "1" and setting a pixel value of pixels positioned at the same coordinates as "the pixels having the other pixel value" to "0", among the pixels constituting the binary image for pink. In addition, the binary image generation part 309 adds data indicating pink to the binary image. Similarly, the binary image generation part 309 also generates a binary image for each of blue and black.

The binary image compression part 310 compresses the three binary images (for the three colors) generated by the binary image generation part 309 to generate three pieces of binary image compressed data. It should be noted that, in the present embodiment, it is assumed that a modified modified read (MMR) method is used as the compression method, but the compression method is not limited thereto. The data integration part 311 integrates the background color data, the three pieces of binary image compressed data, and the sorted color management information 502 to generate compressed data. The generated compressed data is transmitted to a designated reception destination, e.g., the PC 102, via the network I/F 208 and the network 103.

It should be noted that, in the present embodiment, although the data processing part 215 has been described as having a hardware configuration realized by an ASIC, but the data processing part 215 is not limited thereto. For example, the data processing part 215 may be a software module realized by the CPU 205 executing a program stored in the ROM 210 or the like. In a case where the data processing part 215 is a software module, the processing of each module shown in FIG. 3 is realized by the CPU 205 executing a program stored in the ROM 210 or the like.

Next, the minority color compression in the MFP 101 will be described.

The user inputs a reading instruction in which minority color compression is designated as the data format, into the operation part 203. Then, the operation part I/F 207 outputs a notification indicating that the reading instruction has been received, to the CPU 205. The CPU 205 outputs a document reading instruction to the scanner part 201 based on the notification received from the operation part I/F 207. The scanner part 201, according to the reading instruction, reads a document and generates a scanned image of the document. It should be noted that, in the present embodiment, as an example, an original image 400 that is a scanned image of 300 dots per inch (dpi) and 8 bits for each of RGB is generated. The scanner part 201 outputs the generated original image 400 to the data processing part 215. The data processing part 215 performs minority color compression processing of FIG. 6 based on the original image 400 received from the scanner part 201.

It should be noted that, in the present embodiment, although, as an example, a configuration in which the minority color compression processing is performed on the scanned image generated by the scanner part 201 will be described, but the configuration is not limited thereto. For example, the MFP 101 may perform minority color compression processing on an image received from an external device by the network I/F 208.

Figure 6:
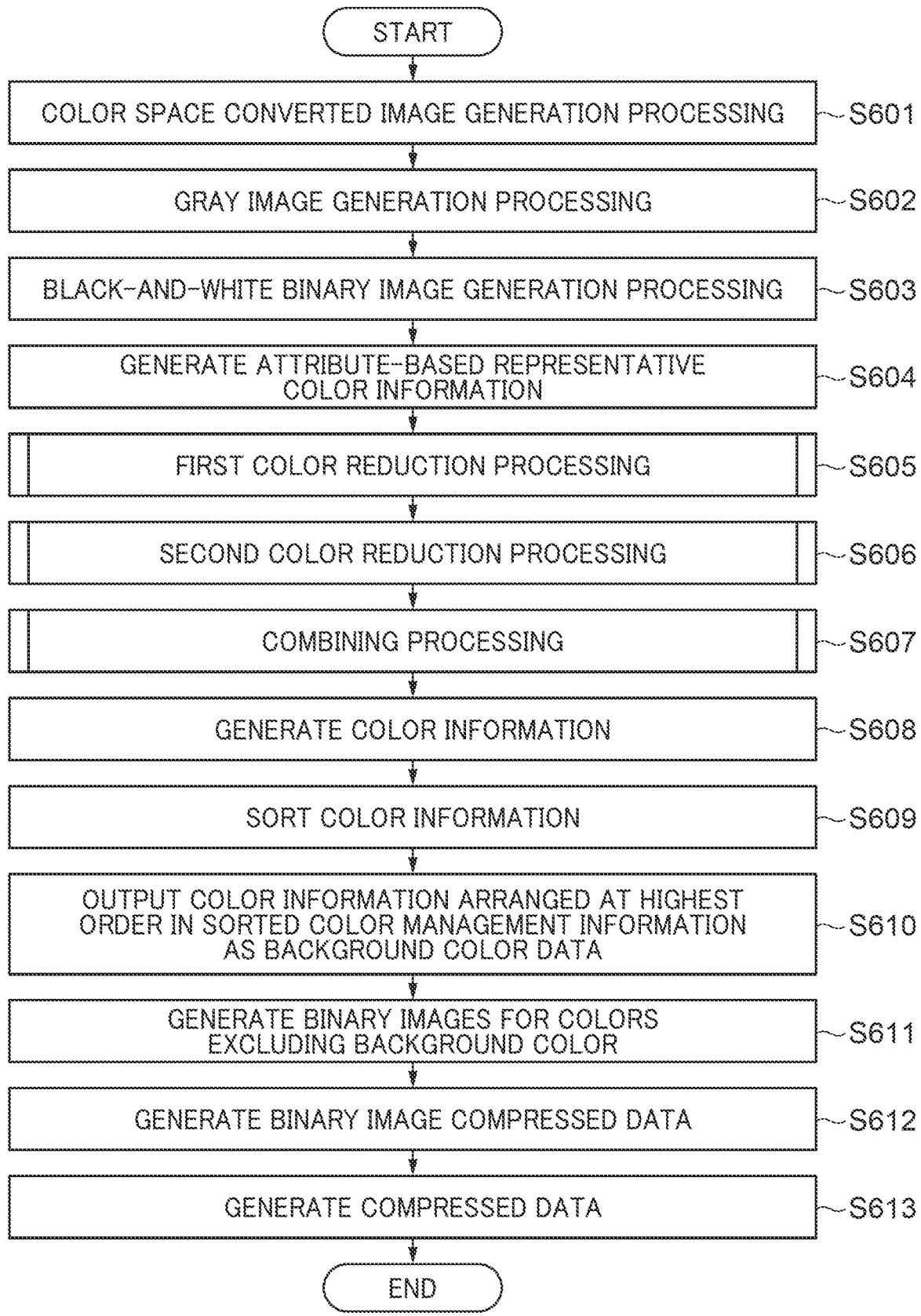
FIG. 6 is a flowchart showing a procedure of minority color compression processing executed by the data processing part of FIG. 2.

FIG. 6 is a flowchart showing a procedure of minority color compression processing executed by the data processing part 215 of FIG. 2. The minority color compression processing of FIG. 6 is executed according to an instruction received by the data processing part 215 from the CPU 205.

In FIG. 6, first, the data processing part 215 controls the color space converted image generation part 300 to perform the color space converted image generation processing described above, based on signal values in the acquired original image 400 (step S601). As a result, a color space converted image 401 that is an image of 8 bits for each of HSV is generated. The color space converted image 401 is output to the gray image generation part 301.

Next, the data processing part 215 controls the gray image generation part 301 to perform the gray image generation processing described above, based on signal values in the color space converted image 401 (step S602). As a result, a chroma gray image 402 and a brightness gray image 403, which are grayscale 8-bit images having the same size as the original image 400, are generated.

Next, the data processing part 215 controls the black-and-white binary image generation part 302 to perform black-and-white binary image generation processing, based on signal values in the gray image generated by the gray image generation part 301 (step S603). In the black-and-white binary image generation processing, as described above, a binarization method using a signal value distribution in each of the chroma gray image 402 and the brightness gray image 403 is used. In step S603, a chroma black-and-white binary image 404 is generated using the signal value distribution in the chroma gray image 402, and a brightness black-and-white binary image 405 is generated using the signal value distribution in the brightness gray image 403. Each of the chroma black-and-white binary image 404 and the brightness black-and-white binary image 405 is a black-and-white 2-bit image having the same size as the original image 400.

Next, the data processing part 215 controls the attribute-based representative color determination part 303 to generate attribute-based representative color information 406 based on the original image 400, the chroma black-and-white binary image 404, and the brightness black-and-white binary image 405 (step S604). It should be noted that the above-described method is used for generating the attribute-based representative color information 406.

Next, the data processing part 215 controls the attribute-based color reduction processing part 304 to execute first color reduction processing (FIG. 8A) based on the original image 400, the chroma black-and-white binary image 404, and the attribute-based representative color information 406 (step S605). Next, the data processing part 215 controls the attribute-based color reduction processing part 304 to execute second color reduction processing (FIG. 8B) based on the original image 400, the brightness black-and-white binary image 405, and the attribute-based representative color information 406 (step S606). It should be noted that, in the present embodiment, a configuration in which the first color reduction processing and the second color reduction processing are executed in this order will be described, but the order in which the first color reduction processing and the second color reduction processing are executed is not limited thereto. For example, the second color reduction processing and the first color reduction processing may be executed in this order.

For example, it is assumed that a thick line region 410 of the original image 400 is a region corresponding to a line, on a scanned paper document, drawn by the user with a pink fluorescent pen. In this case, unevenness may occur in the density of the line drawn with the fluorescent pen. Therefore, even if the line drawn with the fluorescent pen is originally of only pink, a part of the thick line region 410 may be of light pink when the paper document is scanned. Here, FIG. 7A shows a distribution diagram of brightness signal values and chroma signal values of colors in the original image 400. In this distribution diagram, a vertical axis represents a brightness signal value, and a horizontal axis represents a chroma signal value. In this distribution diagram, it is shown that a color located on a further upward side has a higher brightness, and a color located on a further rightward side has a higher chroma. From the viewpoint of brightness, it can be seen that white and light pink are close to each other. If the conventional color reduction processing is performed on such an original image 400, depending on the luminance value of light pink, a part of the thick line region 410 is color-reduced to white that is the background color, and blurring or the like occurs.

On the other hand, in the present embodiment, in order to color-reduce white and light pink as different colors, the first color reduction processing of FIG. 8A is performed using the chroma black-and-white binary image 404 generated based on the distribution of chroma signal values, the attribute-based representative color information 406, and the original image 400. Furthermore, in order to distinguish between white and black, which are colors close to each other in terms of chroma, the second color reduction processing of FIG. 8B is performed using the brightness black-and-white binary image 405 generated based on the distribution of brightness signal values, the attribute-based representative color information 406, and the original image 400.

FIG. 8A is a flowchart showing a procedure of the first color reduction processing in step S605 of FIG. 6. The first color reduction processing is executed by the attribute-based color reduction processing part 304 of the data processing part 215.

In FIG. 8A, the attribute-based color reduction processing part 304 selects one pixel as a "pixel of interest" from among the plurality of pixels constituting the original image 400 (step S801). It should be noted that the pixel of interest may be selected in any order. In the present embodiment, as an example, it is assumed that the pixel of interest is selected in the order of raster scanning of the entire original image 400.

Next, the attribute-based color reduction processing part 304 determines whether or not the pixel of interest has a high chroma attribute, based on the chroma black-and-white binary image 404 (step S802). Specifically, the attribute-based color reduction processing part 304 determines whether a pixel value of a pixel positioned at the same coordinates as the pixel of interest among the pixels constituting the chroma black-and-white binary image 404 is "0" or "1". In a case where the pixel value of the pixel positioned at the same coordinates as the pixel of interest among the pixels constituting the chroma black-and-white binary image 404 is "1" (e.g., a white region of the chroma black-and-white binary image 404 of FIG. 4E), it is determined that the pixel of interest has a high chroma attribute (YES in step S802). In this case, the first color reduction processing proceeds to step S803. In a case where the pixel value of the pixel positioned at the same coordinates as the pixel of interest among the pixels constituting the chroma black-and-white binary image 404 is "0" (e.g., a black region of the chroma black-and-white binary image 404 of FIG. 4E), it is determined that the pixel of interest does not have a high chroma attribute, i.e., the pixel of interest has a low chroma attribute (NO in step S802). In this case, the first color reduction processing proceeds to step S804.

In step S803, the attribute-based color reduction processing part 304 converts an RGB value of the pixel of interest into an RGB value indicating a color set in the attribute-based representative color information 406 as the representative color of the high chroma attribute. Specifically, the attribute-based color reduction processing part 304 selects the color closest to the pixel of interest from among the two colors set in the attribute-based representative color information 406 as representative colors of the high chroma attribute, and converts the RGB value of the pixel of interest into the RGB value of the selected color. In step S803, for example, a color having the smallest difference from the pixel of interest in RGB value is selected from among two colors that are representative colors of the high chroma attribute.

It should be noted that this method is merely an example. For example, the RGB value of the pixel of interest and the RGB value of the representative color of the high chroma attribute may be converted into values in a color space represented by brightness and hue, such as an L*a*b* color space, and the color to be selected may be determined based on a difference between these converted values. As described above, among the plurality of pixels constituting the original image 400, pixels determined to have the high chroma attribute based on the chroma black-and-white binary image 404 are color-reduced using the RGB values of the representative colors of the high chroma attribute shown in 701 of FIG. 7B.

It should be noted that such pixels determined to have the high chroma attribute are, for example, pixels constituting a thick line region 702a, pixels constituting a character region 701b of "E", and pixels constituting a character region 701c of "I" shown in FIG. 7C, in the original image 400. When the processing of step S803 is completed, the first color reduction processing proceeds to step S805.

In step S804, the attribute-based color reduction processing part 304 converts an RGB value of the pixel of interest into an RGB value indicating a color set in the attribute-based representative color information 406 as the representative color of the low chroma attribute. As described above, in the present embodiment, among the plurality of pixels constituting the original image 400, pixels determined to have the low chroma attribute based on the chroma black-and-white binary image 404 are color-reduced using the RGB value of the representative color of the low chroma attribute shown in 703 of FIG. 7D. It should be noted that such pixels determined to have the low chroma attribute are, for example, pixel constituting a background region 704a and pixels constituting a character region 704b of "H" shown in FIG. 7E, in the original image 400. When the processing of step S804 is completed, the first color reduction processing proceeds to step S805.

In step S805, the attribute-based color reduction processing part 304 determines whether or not all the pixels constituting the original image 400 have already been selected as the pixels of interest. In a case where it is determined in step S805 that any pixel constituting the original image 400 has not been selected as the pixel of interest, the first color reduction processing returns to step S801. In a case where it is determined in step S805 that all the pixels constituting the original image 400 have already been selected as the pixels of interest, the first color reduction processing ends. By performing the first color reduction processing, a chroma color-reduced image 407 is generated. Thereafter, the minority color compression processing proceeds to step S606 of FIG. 6.

FIG. 8B is a flowchart showing a procedure of the second color reduction processing in step S606 of FIG. 6. The second color reduction processing is also executed by the attribute-based color reduction processing part 304 of the data processing part 215.

In FIG. 8B, the attribute-based color reduction processing part 304 selects one pixel as a "pixel of interest" from among the plurality of pixels constituting the original image 400 (step S806). It should be noted that the pixel of interest may be selected in any order. In the present embodiment, as an example, it is assumed that the pixel of interest is selected in the order of raster scanning of the entire original image 400.

Next, the attribute-based color reduction processing part 304 determines whether or not the pixel of interest has a high brightness attribute, based on the brightness black-and-white binary image 405 (step S807). Specifically, the attribute-based color reduction processing part 304 determines whether a pixel value of a pixel positioned at the same coordinates as the pixel of interest among the pixels constituting the brightness black-and-white binary image 405 is "0" or "1". In a case where the pixel value of the pixel positioned at the same coordinates as the pixel of interest among the pixels constituting the brightness black-and-white binary image 405 is "1" (e.g., a white region of the brightness black-and-white binary image 405 of FIG. 4F), it is determined that the pixel of interest has a high brightness attribute (YES in step S807). In this case, the second color reduction processing proceeds to step S808. In a case where the pixel value of the pixel positioned at the same coordinates as the pixel of interest among the pixels constituting the brightness black-and-white binary image 405 is "0" (e.g., a black region of the brightness black-and-white binary image 405 of FIG. 4F), it is determined that the pixel of interest does not have a high brightness attribute, i.e., the pixel of interest has a low brightness attribute (NO in step S807). In this case, the second color reduction processing proceeds to step S809.

In step S808, the attribute-based color reduction processing part 304 converts an RGB value of the pixel of interest into an RGB value indicating a color set in the attribute-based representative color information 406 as the representative color of the high brightness attribute. As described above, among the plurality of pixels constituting the original image 400, pixels determined to have the high brightness attribute based on the brightness black-and-white binary image 405 are color-reduced using the RGB value of the representative color of the high brightness attribute shown in 705 of FIG. 7F. It should be noted that such pixels determined to have the high brightness attribute are, for example, pixels constituting a thick line region 706a, pixels constituting a character region 706b of "E", pixels constituting a character region 706c of "I", and pixels constituting a background region 706d shown in FIG. 7G, in the original image 400. When the processing of step S808 is completed, the second color reduction processing proceeds to step S810.

In step S809, the attribute-based color reduction processing part 304 converts an RGB value of the pixel of interest into an RGB value indicating a color set in the attribute-based representative color information 406 as the representative color of the low brightness attribute. As described above, in the present embodiment, among the plurality of pixels constituting the original image 400, pixels determined to have the low brightness attribute based on the brightness black-and-white binary image 405 are color-reduced using the RGB value of the representative color of the low brightness attribute shown in 707 of FIG. 7H. It should be noted that such pixels determined to have the low brightness attribute are, for example, pixels constituting a character region 708 of "H" shown in FIG. 7I, in the original image 400. When the processing of step S809 is completed, the second color reduction processing proceeds to step S810.

In step S810, the attribute-based color reduction processing part 304 determines whether or not all the pixels constituting the original image 400 have already been selected as the pixels of interests. In a case where it is determined in step S810 that any pixel constituting the original image 400 has not been selected as the pixel of interest, the second color reduction processing returns to step S806. In a case where it is determined in step S810 that all the pixels constituting the original image 400 have already been selected as the pixels of interest, the second color reduction processing ends. By performing the second color reduction processing, a brightness color-reduced image 408 is generated. Thereafter, the minority color compression processing proceeds to step S607 of FIG. 6.

Returning to FIG. 6, in step S607, the data processing part 215 controls the color-reduced image combining part 305 to execute combining processing of FIG. 9 based on the brightness black-and-white binary image 405, the chroma color-reduced image 407, and the brightness color-reduced image 408.

FIG. 9 is a flowchart showing a procedure of the combining processing in step S607 of FIG. 6. The combining processing is executed by the color-reduced image combining part 305 of the data processing part 215.

In FIG. 9, the color-reduced image combining part 305 selects one pixel as a "pixel of interest" from among a plurality of pixels constituting the chroma color-reduced image 407 (step S901). It should be noted that the pixel of interest may be selected in any order. In the present embodiment, as an example, it is assumed that the pixel of interest is selected in the order of raster scanning of the entire chroma color-reduced image 407.

Next, the color-reduced image combining part 305 determines whether or not the pixel of interest has a low brightness attribute, based on the brightness black-and-white binary image 405 (step S902). Specifically, the color-reduced image combining part 305 determines whether the pixel value of the pixel having the same coordinates as the pixel of interest among the pixels constituting the brightness black-and-white binary image 405 is "0" or "1". In a case where the pixel value of the pixel positioned at the same coordinates as the pixel of interest among the pixels constituting the brightness black-and-white binary image 405 is "1" (e.g., a white region of the brightness black-and-white binary image 405 of FIG. 4F), it is determined that the pixel of interest does not a low brightness attribute, i.e., the pixel of interest has a high brightness attribute (NO in step S902). In this case, the combining processing proceeds to step S904. In a case where the pixel value of the pixel positioned at the same coordinates as the pixel of interest among the pixels constituting the brightness black-and-white binary image 405 is "0" (e.g., a black region of the brightness black-and-white binary image 405 of FIG. 4F), it is determined that the pixel of interest has a low brightness attribute (YES in step S902). In this case, the combining processing proceeds to step S903.

Figure 10A:
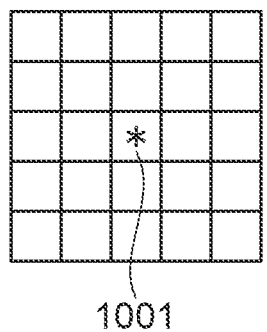
FIGS. 10A to 10D are diagrams for explaining processing in step S903 of FIG. 9 in detail.
Figure 10B:
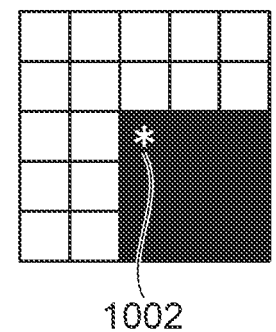
Figure 10C:
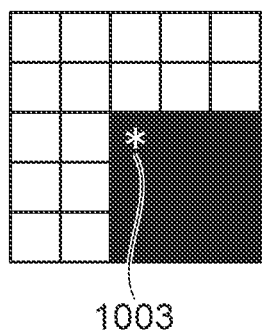
Figure 10D:
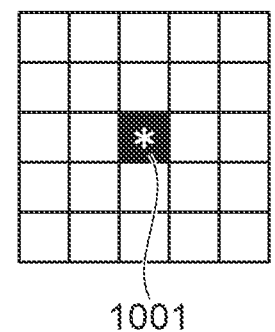

In step S903, the color-reduced image combining part 305 converts an RGB value of the pixel of interest into an RGB value of a pixel positioned at the same coordinates as the pixel of interest in the brightness color-reduced image 408. Here, the processing of step S903 will be described in detail with reference to FIGS. 10A to 10D. FIG. 10A is an enlarged view of a region around a pixel 1001 of interest in the chroma color-reduced image 407. FIG. 10B is an enlarged view of a region around a pixel 1002 positioned at the same coordinates as the pixel 1001 of interest, in the brightness black-and-white binary image 405. FIG. 10C is an enlarged view of a region around a pixel 1003 positioned at the same coordinates as the pixel 1001 of interest, in the brightness color-reduced image 408. Since the pixel 1002 positioned at the same coordinates as the pixel 1001 of interest among the pixels constituting the brightness black-and-white binary image 405 is black as shown in FIG. 10B, that is, the pixel value thereof is "0", the pixel 1001 of interest is determined to have a low brightness attribute in step S902. Furthermore, in step S903, an RGB value of the pixel 1001 of interest is converted into an RGB value of the pixel 1003 positioned at the same coordinates as the pixel 1001 of interest in the brightness color-reduced image 408, that is, into an RGB value of the representative color of the low brightness attribute (for example, see the pixel 1001 of interest in FIG. 10D).

Next, the color-reduced image combining part 305 determines whether or not all the pixels constituting the chroma color-reduced image 407 have already been selected as the pixels of interest (step S904). In a case where it is determined in step S904 that any pixel constituting the chroma color-reduced image 407 has not been selected as the pixel of interest, the combining processing returns to step S901. In a case where it is determined in step S904 that all the pixels constituting the chroma color-reduced image 407 have already been selected as the pixels of interest, the combining processing ends. As described above, in the present embodiment, only the RGB value of the pixel of interest determined to have the low brightness attribute in the chroma color-reduced image 407 is converted into the RGB value of the pixel positioned at the same coordinates as the pixel of interest in the brightness color-reduced image 408. As a result, a composite color-reduced image 409 obtained by combining a black object in the original image 400 with the chroma color-reduced image 407 is generated. Thereafter, the minority color compression processing proceeds to step S608.

Returning to FIG. 6, in step S608, the data processing part 215 controls the color information generation part 306 to generate color information corresponding to each color included in the composite color-reduced image 409. It should be noted that, as described above, the color information includes coordinate information indicating which range of the composite color-reduced image 409 pixels having a pixel value indicating the corresponding color exist in, and information indicating the number of pixels having the pixel value indicating the corresponding color. The generated color information is recorded in the color management information 500.

Next, the data processing part 215 controls the color information sorting part 307 to sort the plurality of pieces of color information included in the color management information 500 based on the number of pixels (step S609). As a result, sorted color management information 502 in which color information corresponding to a color having the largest number of pixels is arranged at the top is generated.

Next, the data processing part 215 controls the background color data generation part 308 to output the color information arranged at the highest order in the sorted color management information 502 as the background color data (step S610). Next, the data processing part 215 controls the binary image generation part 309 to generate a binary image based on the composite color-reduced image 409 and the sorted color management information 502 (step S611). In step S611, as described above, a binary image is generated for each of the three colors (e.g., black, pink, and blue) excluding the background color (e.g., white), which is a color arranged at the highest order in the sorted color management information 502.

Next, the data processing part 215 controls the binary image compression part 310 to perform compression processing on the three binary images generated in step S611, using a compression method such as MMR, to generate three pieces of binary image compressed data (step S612). The binary image compressed data includes MMR compressed data obtained by compressing the binary image by MMR, and color information corresponding to the binary image.

Figure 11:
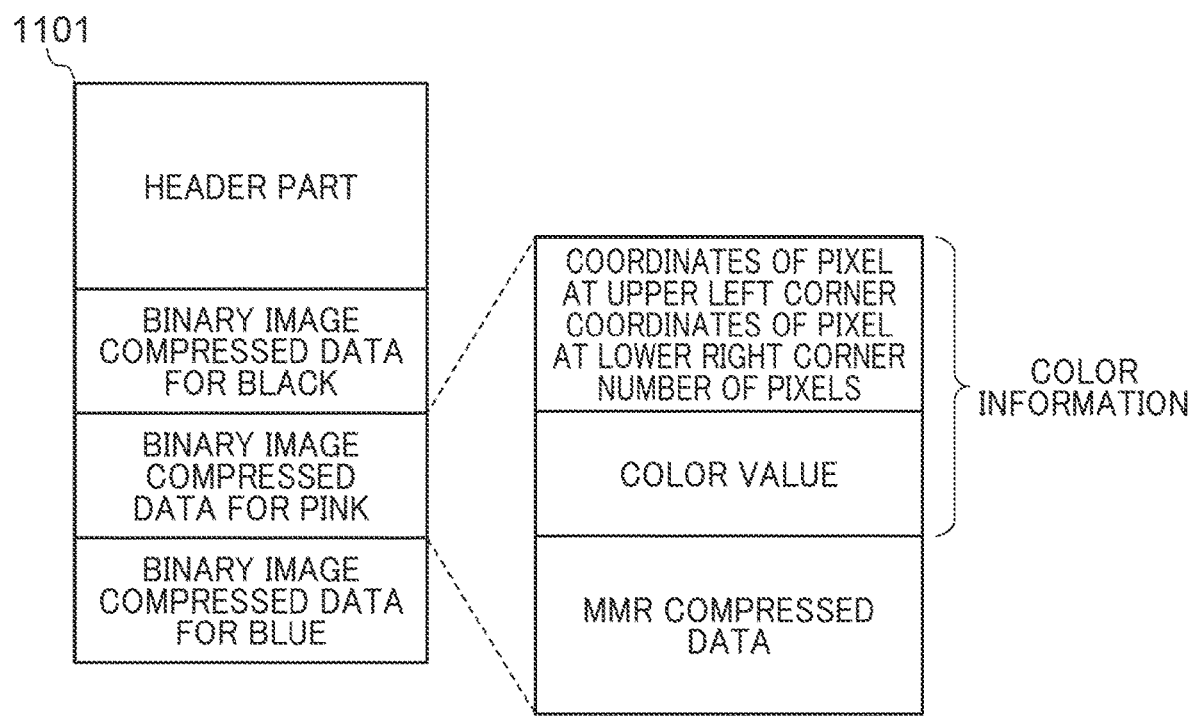
FIG. 11 is a diagram showing an example of compressed data generated in step S613 of FIG. 6.

Next, the data processing part 215 controls the data integration part 311 to integrate the background color data and the three pieces of binary image compressed data generated in step S612, to generate compressed data 1101 of FIG. 11 (step S613). Then, the minority color compression processing ends.

The compressed data 1101 includes a header part and three pieces of binary image compressed data. The header part includes information such as a size (the number of vertical pixels and the number of horizontal pixels) of the original image 400 acquired from the scanner part 201, a color value of the background color, and a resolution. Basically, a color having the largest number of pixels is selected as the background color. Therefore, for example, in a case where color paper such as red paper is used for the document, a red value is included as the color value of the background color.

It should be noted that FIG. 11 shows an example of a configuration of compressed data generated in step S613 in a case where three pieces of binary image compressed data for black, pink, and blue, which are colors other than the background color, are generated in step S612. For example, in a case where N pieces of binary image compressed data corresponding to N colors, which are colors other than the background color, are generated in step S612, the N pieces of binary image compressed data are included in the compressed data. Furthermore, for example, in a case where the original image acquired from the scanner part 201 is an image generated by reading a document on which nothing is drawn on monochrome paper such as white paper, no binary image compressed data is generated. In a case where the original image acquired from the scanner part 201 is an image generated by reading a black-and-white document, one piece of binary image compressed data corresponding to a color other than the background color is generated. Here, in a case where pixels having an RGB value of the color other than the background color are positioned in only a part of the original image, the MMR compressed data can be obtained by compressing only the part of the original image. Therefore, in this case, the MMR compressed data has a smaller data size than that in a case where the entire original image is compressed by MMR.

Further, in the decoding of compressed data 1101, the background region corresponding to the size of original image 400 described in the header part of the compressed data 1101 is drawn with the color value of the background color described in the header part. In addition, the three pieces of binary image compressed data in the compressed data 1101 are sequentially decompressed. The binary images obtained by the decompression are overwritten on the background region according to a position and a color indicated by color information corresponding to the binary images. The generated compressed data 1101 is transmitted to a designated reception destination, e.g., the PC 102, via the network I/F 208 and the network 103.

According to the embodiment described above, the following processing is executed in the MFP 101. First, a representative color of a high chroma attribute is determined, based on an RGB value of a pixel determined to have the high chroma attribute based on the chroma black-and-white binary image 404 among the pixels constituting the original image 400. Furthermore, a representative color of a low chroma attribute is determined, based on an RGB value of a pixel determined to have the low chroma attribute based on the chroma black-and-white binary image 404 among the pixels constituting the original image 400. Furthermore, a representative color of a low brightness attribute is determined, based on an RGB value of a pixel determined to have the low brightness attribute based on the brightness black-and-white binary image 405 among the pixels constituting the original image 400. Then, a chroma color-reduced image 407 (converted image) is generated by converting the RGB value of the pixel determined to have the high chroma attribute among the pixels constituting the original image 400 into the RGB value indicating the representative color of the high chroma attribute, and converting the RGB value of the pixel determined to have the low chroma attribute among the pixels constituting the original image 400 into the RGB value indicating the representative color of the low chroma attribute. Furthermore, a composite color-reduced image 409 (color-reduced image) is generated by converting the RGB value of the pixel determined to have the low brightness attribute based on the brightness black-and-white binary image 405 among the pixels constituting the chroma color-reduced image 407 into the RGB value indicating the representative color of the low brightness attribute.

As a result, while reproducing a black object in the original image 400, a region of a high chroma attribute, e.g., a region of an object having a high luminance value and a variation in density, like a line drawn with a fluorescent pen, and a region of a low chroma attribute, e.g., a region of a background color (white), can be color-reduced as different colors. As a result, a color-reduced image having high object reproducibility can be generated.

Furthermore, in the above-described embodiment, in a case where a plurality of colors is determined as the representative color of the high chroma attribute, the RGB value of the pixel determined to have the high chroma attribute based on the chroma black-and-white binary image 404 is converted into an RGB value indicating the color closest to the color indicated by the RGB value among the plurality of colors. As a result, the color of the high chroma region can be converted to have an RGB value of a color different from the background color and close to the actual color, thereby generating a color-reduced image of which the impression does not differ greatly from the real thing while preventing characters from being blurred.

Furthermore, in the above-described embodiment, the MFP 101 is a reading device including a scanner part 201 that reads a document and generates a scanned image of the document. As a result, when color reduction processing is performed on the scanned image generated by the scanner part 201, a color-reduced image having high object reproducibility can be generated.

Although the present invention has been described using the above-described embodiment, the present invention is not limited to the above-described embodiment. For example, a divided black-and-white binary image may be generated for each of a plurality of divided gray images obtained by dividing the gray image generated by the gray image generation part 301, and a black-and-white binary image may be generated by combining all the generated divided black-and-white binary images.

In the above-described embodiment, the configuration in which a color-reduced image is generated using a chroma black-and-white binary image generated based on a distribution of chroma signal values in the entire image and a brightness black-and-white binary image generated based on a distribution of brightness signal values in the entire image has been described. However, in the above-described embodiment, for example, a character having a unique color such as a logo of a company is treated in the same manner as another character, and there is a possibility that object reproducibility deteriorates depending on a distribution of signal values in an image.

Figure 12A:
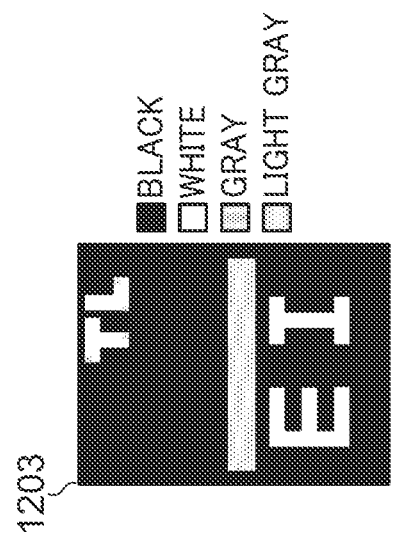
FIGS. 12A to 12K are diagrams for explaining a variation of the present embodiment.
Figure 12B:
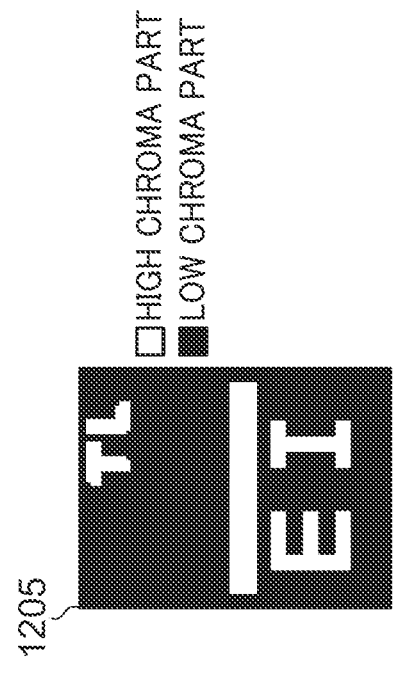
Figure 12C:
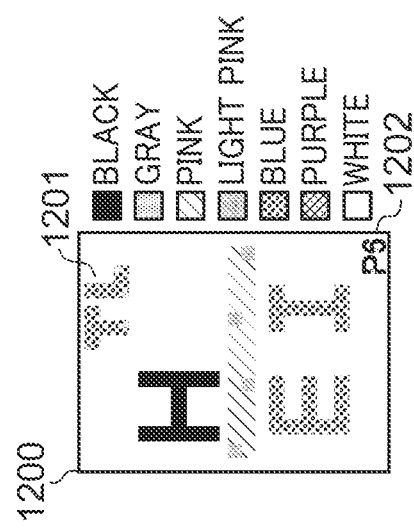

For example, when the data processing part 215 acquires an original image 1200 of FIG. 12A from the scanner part 201, the gray image generation part 301 of the data processing part 215 generates a chroma gray image 1203 of FIG. 12B and a brightness gray image 1204 of FIG. 12C. The original image 1200 is an image including, at an upper right corner thereof, a logo 1201 having a unique color and including, at a lower right corner thereof, a page number 1202 having a unique color. It should be noted that, in the original image 1200, for example, the upper portion and the lower portion thereof are different from each other in signal value distribution characteristic. Similarly, in the chroma gray image 1203 and the brightness gray image 1204, for example, the upper portion and the lower portion thereof are different from each other in signal value distribution characteristic.

Figure 12D:
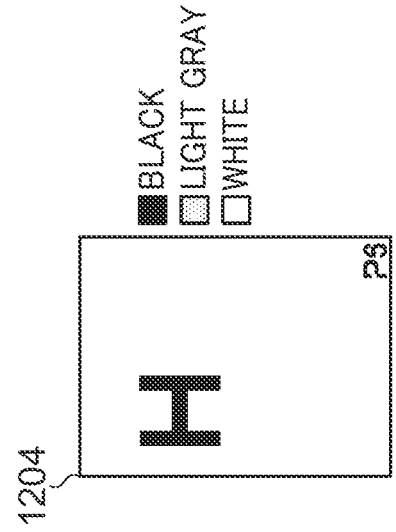
Figure 12E:
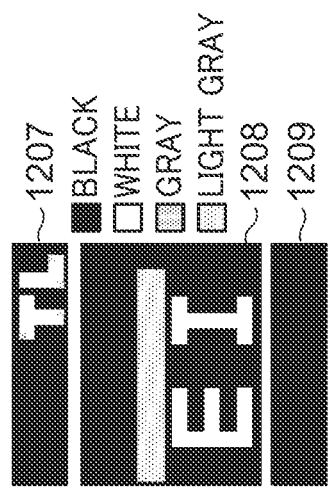

Next, the black-and-white binary image generation part 302 performs binarization processing using the signal value distribution of the chroma gray image 1203 to generate a chroma black-and-white binary image 1205 of FIG. 12D. Furthermore, the black-and-white binary image generation part 302 performs binarization processing using the signal value distribution of the brightness gray image 1204 to generate a brightness black-and-white binary image 1206 of FIG. 12E. Here, when the binarization processing is performed using an image of which parts (e.g., the upper portion and the lower portion) are different from each other in signal value distribution characteristic, such as the chroma gray image 1203 and the brightness gray image 1204, inappropriate processing, e.g., processing in which a character having a unique color is treated in the same manner as another character, may be performed. As a result, a black-and-white binary image in which characters are blurred, such as the chroma black-and-white binary image 1205 and the brightness black-and-white binary image 1206, is generated. If such a black-and-white binary image is used, characters are similarly blurred in a color-reduced image generated by performing color reduction processing using such the black-and-white binary image, resulting in a deterioration in object reproducibility.

On the other hand, in the present embodiment, a divided chroma black-and-white binary image is generated for each of a plurality of divided chroma gray images obtained by dividing the chroma gray image, and a chroma black-and-white binary image is generated by combining all the generated divided chroma black-and-white binary images. In addition, a divided brightness black-and-white binary image is generated for each of a plurality of divided brightness gray images obtained by dividing the brightness gray image, and a brightness black-and-white binary image is generated by combining all the generated divided brightness black-and-white binary images.

FIG. 13 is a flowchart showing another procedure of black-and-white binary image generation processing (black-and-white binary image combining processing) in step S603 of FIG. 6. The black-and-white binary image combining processing of FIG. 13 is executed according to an instruction received by the data processing part 215 from the CPU 205. It should be noted that, in the present embodiment, as an example, it is assumed that a chroma gray image 1203 and a brightness gray image 1204 are generated in step S602 of FIG. 6.

Figure 12F:
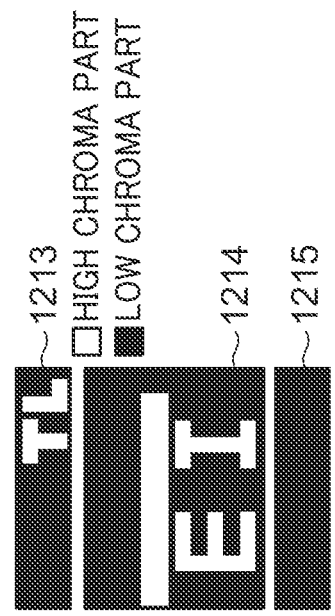
Figure 12G:
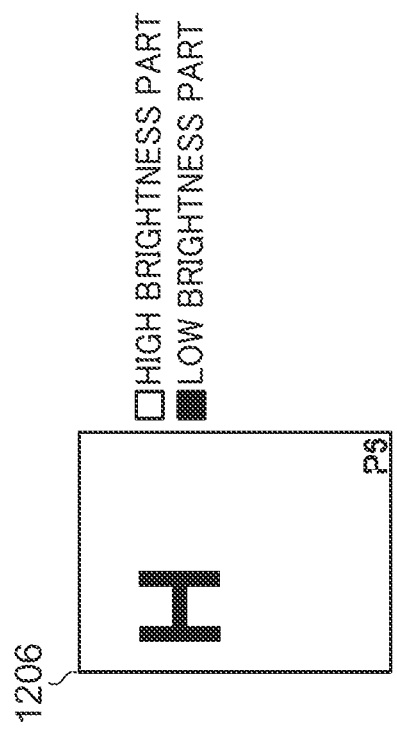

In FIG. 13, first, the data processing part 215 controls the black-and-white binary image generation part 302 to divide the chroma gray image 1203 and the brightness gray image 1204 (step S1301). As for the dividing method, for example, each of the chroma gray image 1203 and the brightness gray image 1204 is divided into an upper image area, a central image area, and a lower image area determined in advance using values stored in the ROM 210. This is because a character having a unique color, such as a logo or a page number, is often arranged at the upper portion or the lower portion of the image. By performing step S1301, three divided chroma gray images, specifically, an upper chroma gray image 1207, a central chroma gray image 1208, and a lower chroma gray image 1209, are generated, as shown in FIG. 12F, from the chroma gray image 1203. In addition, three divided brightness gray images, specifically, an upper brightness gray image 1210, a central brightness gray image 1211, and a lower brightness gray image 1212, are generated, as shown in FIG. 12G, from the brightness gray image 1204.

Figure 12H:
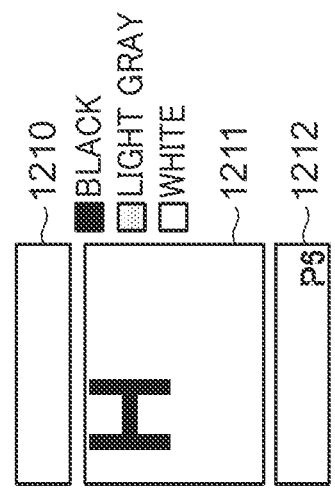
Figure 12J:
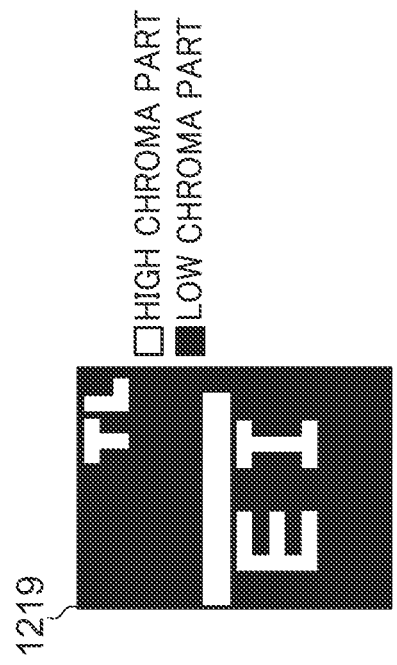
Figure 12I:
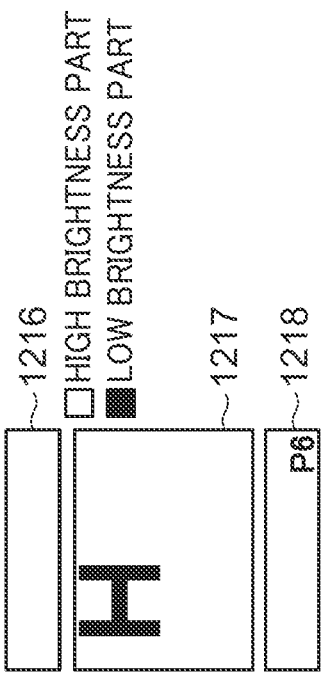

Next, the data processing part 215 controls the black-and-white binary image generation part 302 to generate a divided black-and-white binary image for each of the plurality of generated divided gray images (step S1302). Specifically, referring to FIG. 12H, in step S1302, an upper chroma black-and-white binary image 1213 is generated based on a signal value distribution of the upper chroma gray image 1207. A central chroma black-and-white binary image 1214 is generated based on a signal value distribution of the central chroma gray image 1208. A lower chroma black-and-white binary image 1215 is generated based on a signal value distribution of the lower chroma gray image 1209. Referring to FIG. 12I, an upper brightness black-and-white binary image 1216 is generated based on a signal value distribution of the upper brightness gray image 1210. A central brightness black-and-white binary image 1217 is generated based on a signal value distribution of the central brightness gray image 1211. A lower brightness black-and-white binary image 1218 is generated based on a signal value distribution of the lower brightness gray image 1212. It should be noted that, in step S1302, similarly to step S603, "Otsu's binarization" is used as the binarization method.

Figure 12K:
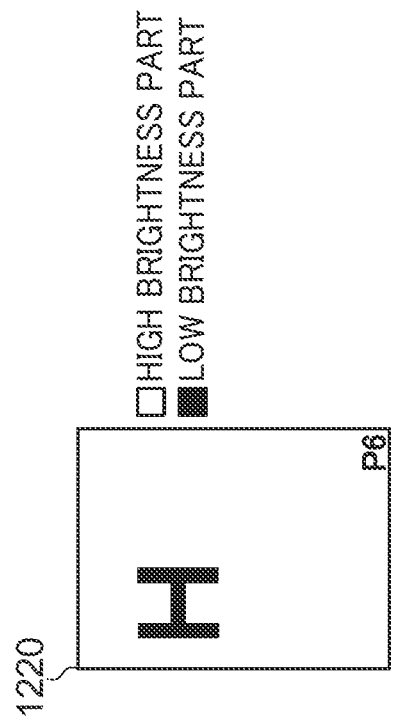

Next, the data processing part 215 controls the black-and-white binary image generation part 302 to combine the divided black-and-white binary images (step S1303). Specifically, the black-and-white binary image generation part 302 combines the upper chroma black-and-white binary image 1213, the central chroma black-and-white binary image 1214, and the lower chroma black-and-white binary image 1215 to generate a chroma black-and-white binary image 1219 of FIG. 12J. Furthermore, the black-and-white binary image generation part 302 combines the upper brightness black-and-white binary image 1216, the central brightness black-and-white binary image 1217, and the lower brightness black-and-white binary image 1218 to generate a brightness black-and-white binary image 1220 of FIG. 12K. Upon completion of step S1103, the black-and-white binary image generation processing ends. Thereafter, the minority color compression processing proceeds to step S604 described above.

As described above, in the present embodiment, divided chroma black-and-white binary images (divided chroma binary images) are generated for each of the plurality of divided chroma gray images obtained by dividing the chroma gray image 1203. Then, a chroma black-and-white binary image 1219 is generated by combining the generated divided chroma black-and-white binary images. In addition, divided brightness black-and-white binary images (divided brightness binary images) are generated for each of the plurality of divided brightness gray images obtained by dividing the brightness gray image 1204. Then, a brightness black-and-white binary image 1220 is generated by combining the generated divided brightness black-and-white binary images. As a result, when color reduction processing is performed on an image of which regions have different signal value distribution characteristics, a color-reduced image can be generated using black-and-white binary images to which the signal value distribution characteristics for the respective regions are added, so that the generated color-reduced image has high object reproducibility.

Further, in the present embodiment, the plurality of divided chroma gray images are an upper chroma gray image 1207 (an image of an upper region), a central chroma gray image 1208 (an image of a central region), and a lower chroma gray image 1209 (an image of a lower region). In addition, the plurality of divided brightness gray images are an upper brightness gray image 1210, a central brightness gray image 1211, and a lower brightness gray image 1212. As a result, when color reduction processing is performed on an original image in which a region of a character having a unique color such as a logo or a page number is arranged at an upper portion or a lower portion of the image, a color-reduced image having high object reproducibility can be generated.

It should be noted that, in the present embodiment, although it has been described as a method of dividing the gray image that the gray image is divided into an upper image area, a central image area, and a lower image area determined in advance using values stored in the ROM 210, the method of dividing the gray image is not limited thereto. For example, the MFP 101 performs image analysis on the chroma gray image 1203 and the brightness gray image 1204, and determines, based on a result of the image analysis, divided regions of the gray images so that each of the gray images is divided into a region including a character having a unique color such as a logo or a page number and a region of another character. As described above, the same effect as that of the above-described embodiment can be obtained also by determining the regions into which the gray image is divided based on the result of the image analysis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-000569, filed Jan. 5, 2023, which is hereby incorporated by reference wherein in its entirety.

What is claimed is:

1. An image processing apparatus comprising:
at least one memory that stores a set of instructions; and
at least one processor that executes the instructions, the instructions, when being executed, causing the image processing apparatus to:
generate a chroma binary image for determining whether each pixel constituting an acquired image has a high chroma attribute or a low chroma attribute;
generate a brightness binary image for determining whether each pixel constituting the acquired image has a high brightness attribute or a low brightness attribute;
determine at least one first type representative color, based on an RGB value of a pixel determined to have the high chroma attribute based on the chroma binary image among pixels constituting the acquired image;
determine a second type representative color, based on an RGB value of a pixel determined to have the low chroma attribute based on the chroma binary image among the pixels constituting the acquired image;
determine a third type representative color, based on an RGB value of a pixel determined to have the low brightness attribute based on the brightness binary image among the pixels constituting the acquired image;
generate a converted image by converting the RGB value of the pixel determined to have the high chroma attribute based on the chroma binary image among the pixels constituting the acquired image into an RGB value indicating the first type representative color, and converting the RGB value of the pixel determined to have the low chroma attribute based on the chroma binary image among the pixels constituting the acquired image into an RGB value indicating the second type representative color; and
generate a color-reduced image by converting the RGB value of the pixel determined to have the low brightness attribute based on the brightness binary image among pixels constituting the converted image into an RGB value indicating the third type representative color.

2. The image processing apparatus according to claim 1, wherein in a case where a plurality of colors is determined as the first type representative color, the RGB value of the pixel determined to have the high chroma attribute based on the chroma binary image among the pixels constituting the acquired image is converted into an RGB value indicating a color closest to a color indicated by the RGB value of the pixel among the plurality of colors.

3. The image processing apparatus according to claim 1, wherein the at least one processor further executes the instructions causing the image processing apparatus to:
generate a color space converted image by converting RGB values of all the pixels constituting the acquired image into HSV values; and
generate a chroma gray image and a brightness gray image based on the color space converted image,
wherein
a divided chroma binary image is generated for each of a plurality of divided chroma gray images obtained by dividing the chroma gray image,
the divided chroma binary image is generated using a distribution of signal values of all pixels constituting a corresponding divided chroma gray image, and
the chroma binary image is generated by combining all the generated divided chroma binary images,
and wherein
a divided brightness binary image is generated for each of a plurality of divided brightness gray images obtained by dividing the brightness gray image,
the divided brightness binary image is generated using a distribution of signal values of all pixels constituting a corresponding divided brightness gray image, and
the brightness binary image is generated by combining all the generated divided brightness binary images.

4. The image processing apparatus according to claim 3, wherein
the divided chroma gray images are an image of an upper region of the chroma gray image, an image of a central region of the chroma gray image, and an image of a lower region of the chroma gray image, and
the divided brightness gray images are an image of an upper region of the brightness gray image, an image of a central region of the brightness gray image, and an image of a lower region of the brightness gray image.

5. The image processing apparatus according to claim 3, wherein the at least one processor further executes the instructions causing the image processing apparatus to:
perform image analysis on the chroma gray image and the brightness gray image; and
determine regions into which the chroma gray image and the brightness gray image are divided, based on a result of the image analysis.

6. The image processing apparatus according to claim 1, wherein the image processing apparatus is a reading apparatus configured to read a document and generates an image of the document.

7. A control method of an image processing apparatus, comprising:
generating a chroma binary image for determining whether each pixel constituting an acquired image has a high chroma attribute or a low chroma attribute;
generating a brightness binary image for determining whether each pixel constituting the acquired image has a high brightness attribute or a low brightness attribute;
determining at least one first type representative color, based on an RGB value of a pixel determined to have the high chroma attribute based on the chroma binary image among pixels constituting the acquired image;
determining a second type representative color, based on an RGB value of a pixel determined to have the low chroma attribute based on the chroma binary image among the pixels constituting the acquired image;
determining a third type representative color, based on an RGB value of a pixel determined to have the low brightness attribute based on the brightness binary image among the pixels constituting the acquired image;
generating a converted image by converting the RGB value of the pixel determined to have the high chroma attribute based on the chroma binary image among the pixels constituting the acquired image into an RGB value indicating the first type representative color, and converting the RGB value of the pixel determined to have the low chroma attribute based on the chroma binary image among the pixels constituting the acquired image into an RGB value indicating the second type representative color; and
generating a color-reduced image by converting the RGB value of the pixel determined to have the low brightness attribute based on the brightness binary image among pixels constituting the converted image into an RGB value indicating the third type representative color.

8. A non-transitory computer-readable storage medium storing a program for causing a computer to execute a control method of an image processing apparatus, the control method comprising:

generating a chroma binary image for determining whether each pixel constituting an acquired image has a high chroma attribute or a low chroma attribute;

generating a brightness binary image for determining whether each pixel constituting the acquired image has a high brightness attribute or a low brightness attribute;

determining at least one first type representative color, based on an RGB value of a pixel determined to have the high chroma attribute based on the chroma binary image among pixels constituting the acquired image;

determining a second type representative color, based on an RGB value of a pixel determined to have the low chroma attribute based on the chroma binary image among the pixels constituting the acquired image;

determining a third type representative color, based on an RGB value of a pixel determined to have the low brightness attribute based on the brightness binary image among the pixels constituting the acquired image;

generating a converted image by converting the RGB value of the pixel determined to have the high chroma attribute based on the chroma binary image among the pixels constituting the acquired image into an RGB value indicating the first type representative color, and converting the RGB value of the pixel determined to have the low chroma attribute based on the chroma binary image among the pixels constituting the acquired image into an RGB value indicating the second type representative color; and generating a color-reduced image by converting the RGB value of the pixel determined to have the low brightness attribute based on the brightness binary image among pixels constituting the converted image into an RGB value indicating the third type representative color.

* * * * *